(12) United States Patent
Featonby et al.

(10) Patent No.: US 11,138,049 B1
(45) Date of Patent: Oct. 5, 2021

(54) GENERATING NARRATIVES FOR OPTIMIZED COMPUTE PLATFORMS

(71) Applicant: Amazon Technologies, Inc., Seattle, WA (US)

(72) Inventors: Malcolm Featonby, Sammamish, WA (US); John Merrill Phillips, Seattle, WA (US); Leslie Johann Lamprecht, Seattle, WA (US); Roberto Pentz De Faria, Sammamish, WA (US); Hou Liu, Issaquah, WA (US); Umesh Chandani, Seattle, WA (US); Ladan Mahabadi, Seattle, WA (US); Letian Feng, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 114 days.

(21) Appl. No.: 16/449,949

(22) Filed: Jun. 24, 2019

(51) Int. Cl.
    *G06F 9/50*     (2006.01)
    *G06F 9/455*     (2018.01)
    *G06F 11/30*     (2006.01)

(52) U.S. Cl.
    CPC ........ *G06F 9/5088* (2013.01); *G06F 9/45558* (2013.01); *G06F 9/5027* (2013.01); *G06F 11/301* (2013.01); *G06F 2009/4557* (2013.01); *G06F 2009/45595* (2013.01)

(58) Field of Classification Search
    CPC .............. G06F 9/45558; G06F 9/5027; G06F 2009/4557; G06F 2009/45595
    See application file for complete search history.

(56) References Cited

U.S. PATENT DOCUMENTS 10,564,998 B1 *   2/2020   Gritter .................. G06F 9/5083
2016/0335131 A1 *  11/2016  Goh ...................... G06F 9/5083

* cited by examiner

*Primary Examiner* — Jacob D Dascomb
(74) *Attorney, Agent, or Firm* — Lee & Hayes, P.C.

(57) ABSTRACT

Techniques for an optimization service of a service provider network to provide users with machine-generated narratives that include human-intelligible, credible, and transparent recommendations and rationales for recommended VM instance types. The optimization service may gather various information or data about the workload, such as utilization characteristics of the underlying computing resources, and decompose the workloads through a number of dimensions that can be used to describe the workload. Further, the optimization service may analyze the utilization characteristics and/or other data to determine more optimized VM instance types for the workloads that are to be recommended to the users, and also rationales that describes why each recommendation is an appropriate fit for the workload being assessed. Using this information, the optimization service may generate narratives that include a description of the workload behaviors and utilization patterns, a set of recommendations, and supporting narrative or rationales for each of the recommendations.

20 Claims, 11 Drawing Sheets

GENERATING NARRATIVES FOR OPTIMIZED COMPUTE PLATFORMS

BACKGROUND

Service providers offer cloud-based services to fulfill users' computing-service needs without the users having to invest in and maintain computing infrastructure required to implement the services. These service providers maintain networks of managed computing resources and functionality to implement various types of scalable, on-demand services, such as storage services, compute services, database services, networking services, and so forth. The networks of computing resources, or "service provider networks," can include computing systems that are located across multiple, distinct regions and interconnected by a communication network, or a series of communication networks, to exchange data. Specifically, data centers or data processing centers, may include a number of interconnected computing devices (or "servers") to provide computing resources to users of the service provider networks.

To increase the utilization of the computing resources, virtualization technologies may allow a single physical computing device to host multiple virtual computing resources. For example, a single computing device can host multiple instances of virtual machines (VM) (also referred to herein as "virtual machine instances" or "VM instances") that appear and operate as independent physical computing devices for users, but each share or are allocated portions of the computing resources of the single, underlying physical computing device. In this way, rather than having a single user or process underutilize the resources of a physical computing device, multiple users or processes can utilize the resources of the physical computing device to increase resource utilization.

To further increase the utilization of the computing resources, and also to more effectively meet the computing resource needs of users, service provider networks may offer a variety of different types of virtual machines. Specifically, a service provider network may offer a selection of VM instance types that are optimized, or biased, to support different use cases on behalf of users. In such examples, the different VM instance types may be allocated different amounts, and/or different combinations, of the computing resources of underlying physical computing devices to provide users with flexibility to choose a VM instance that is more appropriately optimized to support their computing resource needs.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
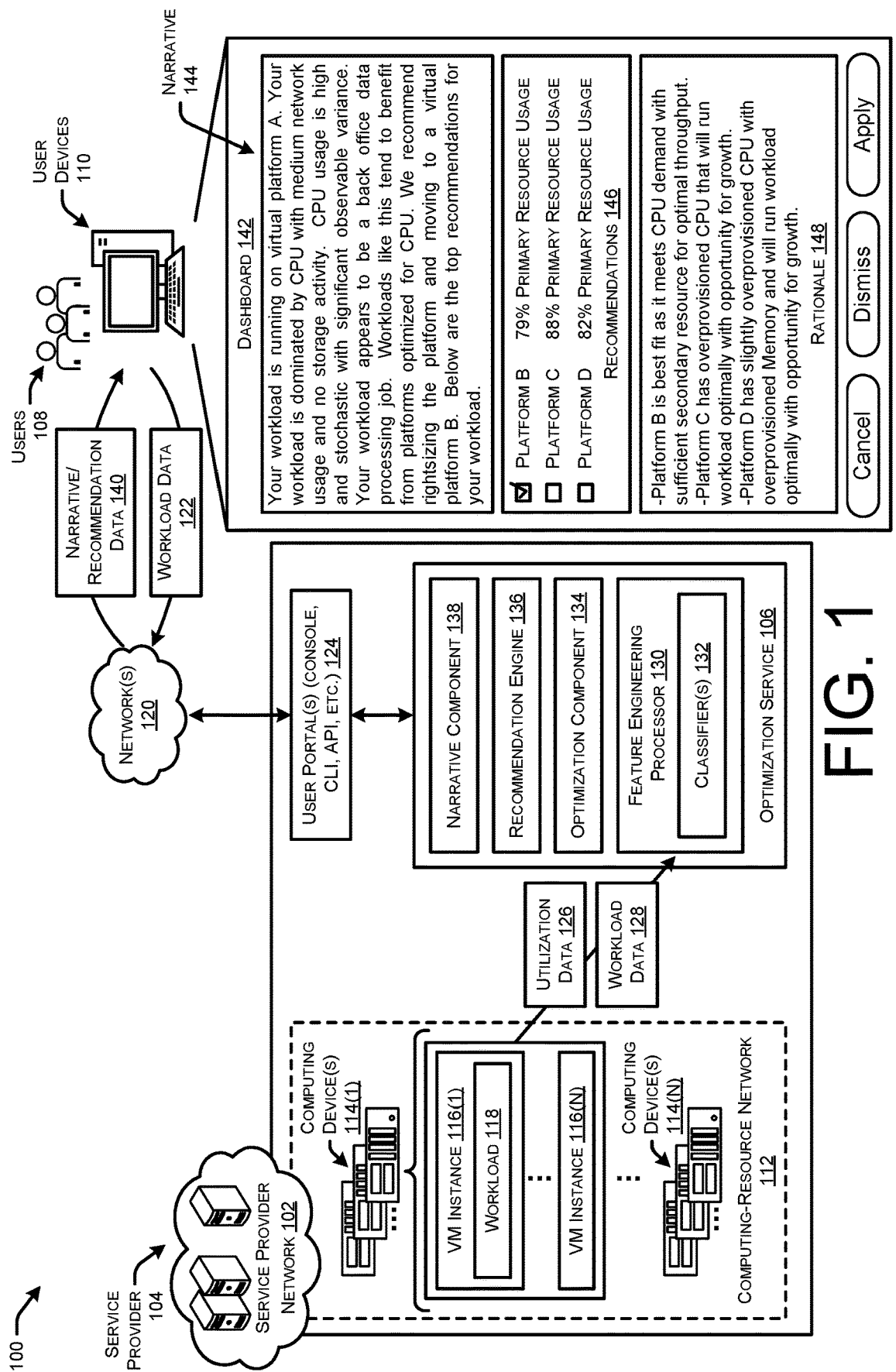
FIG. 1 illustrates a system-architecture diagram of an example environment in which an optimization service of a service provider network determines VM instance types that are optimized to support workloads on behalf of users. Further, the optimization service provides users with narratives that describe the workload and why the VM instance types are recommended for the workloads.

Service providers offer various network-based (or "cloud-based") services to users to fulfill computing needs of the users. These service providers may operate service provider networks that include clusters of managed servers (or other hardware-based computing devices) stored in data centers located across different geographic regions. A user of the service provider network can request that the service provider allocate computing resources in these data centers to support computing workloads on behalf of the users. One or more services of the service provider network can receive these requests and allocate physical computing resources to support the workloads, such as usage of computer processors, memory, storage drives, computer network interfaces, and/or other hardware resources of a computing device, for the user.

As noted above, the service provider networks may utilize virtualization technologies such that the computing devices can each host multiple VM instances that appear and operate as independent computing devices to support workloads of users. Rather than allocating all of the computing resources of a physical computing device to support a single workload for a user, the computing resources of a physical computing device can be allocated amongst multiple VM instances that support different workloads. The service provider network supports many different types of workloads on behalf of users, and these workloads often have different computing resource needs. As described herein, a workload is implemented by a designated set of computing resources and the workload itself can be considered as code or logic that performs functionality using the computing resources. The service provider network may support a wide variety of workloads, such as web servers, databases, customer-facing applications, distributed data stores, batch processing, machine/deep learning training and/or inference, online gaming, video encoding, memory caching, and/or any other type of workload that can be supported by computing resources of a service provider network.

In light of the different workloads that are supported on behalf of users, the service provider network may provide users with a selection of a variety of VM instance types optimized to support different workloads. Generally, each VM instance type may be allocated a different amount of computing resources, and/or different combination of computing resources, such that the VM instance types are optimized, or computationally biased, to support different workloads. As used herein, computing resources refers to compute, memory, storage, networking, and, in some implementations, graphics processing. As an example, one VM instance type may be allocated a larger amount of compute (e.g., processor cycles) and be optimized to support compute-heavy workloads, whereas another VM instance type may be allocated a larger amount of storage (e.g., disk space) and be optimized to support storage-intensive workloads. In this way, users can select a VM instance type or platform that is more optimized to support their workload, thereby increasing the performance of the workload while reducing underutilization of computing resources by the service provider network.

Generally, an increase in the complexity and diversity of VM instance types offered by the service provider network is advantageous and results in a higher likelihood that workloads are supported by a more optimized VM instance. While a large variety of VM instance types is advantageous for various reasons (e.g., efficient utilization of computing resources, high performance for workloads, etc.), it also may become difficult for users, particularly new users, to select a suitable or appropriate VM instance type to support their workload(s). For example, users may attempt to map out the computing resource needs of their workload and then peruse the offering of VM instance types to locate a VM instance type that seems appropriate for their needs. In other examples, users may go through a time-consuming trial-and-error process to analyze performance of their workloads using different VM instance types. However, not only is this time consuming, but it may also result in users having their workloads hosted on VM instance types that are either overutilized and resource constrained, or underutilized and resulting in computing resources that may be unused and sitting idle. As an example, users may be overly cautious and select an oversized VM instance type to help ensure that their workloads are never resource constrained, which may result in low utilization of computing resources of the service provider network.

Service provider networks may include an optimization service that helps users select, configure, and/or utilize more appropriate or optimized VM instances types to support their workloads. For example, the optimization service may be configured to analyze utilization data representing usage of the underlying physical resources by the workload, and recommend one or more VM instance types to the user that are more optimized (e.g., allocate ratios and/or amounts of the underlying physical resources) for the workload than a currently used VM instance type. As described herein, more optimized, or "optimal," VM instance types may be VM instance types that provide sufficient physical resources for use by a workload so as to avoid inappropriately constraining the workloads throughput while avoiding undue waste of the underlying physical computing resources. The optimization service may provide recommendations to the users that help improve the performance of their workloads, and also increase the aggregate utilization of the computing resources of the service provider network. In addition to receiving the recommended VM instance types, users may desire to receive more transparent recommendations that provides choices along with rationales that describe tradeoffs for the different VM instance types. To increase the confidence that users have in the recommendations for the VM instance types and help ensure adoption, it may be advantageous to have these machine-generated recommendations and rationales be accurate and credible.

This disclosure describes techniques and technologies implemented by an optimization service of a service provider network to provide users with machine-generated narratives that include human-intelligible, credible, and transparent recommendations and rationales for recommended VM instance types. A narrative refers to a body of text and/or graphics that represents recommended VM instance type(s), together with rationale explaining the recommendation, for example an explanation of historical usage analysis that supports the recommendation. The optimization service may gather various information or data about the workload, such as utilization characteristics of the underlying computing resources, and decompose the workloads through a number of dimensions that can be used to describe the workload. Further, the optimization service may analyze the utilization characteristics and/or other data to determine more optimized VM instance types for the workloads that are to be recommended to the users, and also rationales that describe why each recommendation is an appropriate fit for the workload being assessed. Using this information, the optimization service may generate narratives that include a description of the workload behaviors and utilization patterns, a set of recommended VM instance types, and supporting narrative or rationales for each of the recommendations.

To generate narratives and other data described herein, the optimization service may initially collect or obtain utilization data that indicates resource utilization characteristics of the workload over a period of time. The utilization data may represent a "shape" of the utilization characteristics of the workload, such as the amount of usage across each different compute dimension—processing, memory, storage, networking, and optionally graphics processing—which may indicate average or mean utilization, minimum utilization, maximum utilization, and/or other statistics analyses of utilization overtime by the workload. Additional workload data may be obtained by the optimization service, such as security groups and security policies, resource tags, advanced machine images used for the VM instance types, etc.

After obtaining the various data for the workload of a user, the optimization service may analyze and characterize the workload according to various behavioral attributes of the workload. For instance, the optimization service may determine: (i) a frequency characteristic that indicates usage patterns by the workload observed over time for one or more of the various dimensions of compute (e.g., diurnal, semi-diurnal, weekend, non-periodic, etc.); (ii) a stochasticity characteristic that indicates the amount of variability (stochasticity) in the workload over time for one or more of the dimensions of compute; (iii) an amplitude characteristic that indicates an amplitude of the variability for consumption by the workload; (iv) a resource bias characteristic that indicates a primary resource type to which workload is most sensitive; (v) resource-ratio characteristic(s) that indicate ratios between the primary resource type and the other resource types; and/or (vi) a workload type that indicates a workload category from a set of predefined workload categories to which the workload belongs (e.g., database workload, web server workload, backend process workload, etc.).

By characterizing the workload of the user according to one or more of the above-noted behavioral attributes, the optimization service may reason about what VM instance types that workload is optimized to execute on, and further select an optimization target for resource utilization at normal or mean operation levels. Further, the optimization server may determine how much headroom to provide to the workload to accommodate spikes in usage by the workload. As used herein, headroom refers to an amount of resource capacity in excess of some metric of historical capacity usage, for example average usage or maximum usage. Upon identifying the optimization target and headroom goal for the workload, optimization service is able to determine the actual physical resource consumed at the optimization target, add in the headroom determined for the workload, and find the best fit VM instance types (or virtual compute platforms) that meet best meet the criteria for each dimension of compute (e.g., CPU, memory, disk, network performance, and GPU). Generally, the VM instance type with the least waste (best possible provisioning with least unused resource) is the most optimal fit.

The optimization service may then determine and generate a narrative for the recommended VM instance types. The optimization service may utilize the various characteristics or behavior attributes of the workload, along with the recommended VM instance types, to generate the narrative. In some examples, the optimization service may select a narrative template from among a set of predefined narrative templates to be used to generate the narrative. The optimization service may select the narrative template based on the above-noted characteristics or behavioral attributes, such as the workload type or category to which the workload was determined to belong. The narrative template may include populated portions that include template language appropriate for a narrative for that workload type, as well as unpopulated fields that are to be filled or populated with workload-specific information for the workload. In some examples, the narrative templates may include a background portion that provides background information regarding the workload and the VM instance type that is currently supporting the workload. The background portion may help inform the user about their workload, and also instill trust with the user that the optimization service is informed and knowledgeable about the workload of the user. Further, the narrative templates may include a recommendation portion that indicates the recommended VM instance platforms, as well as an indication of a mean utilization by the workload of the primary resource type determined for the workload. The primary resource type refers to the particular resource (e.g., one of CPU, memory, disk, networking, and GPU) that is most heavily used by the workload (based, for example, on percentage of overall resource capacity that is used over time). For instance, the recommendations may indicate a percentage of utilization of a CPU resource allocated to each recommended VM instance type for a compute-biased workload (CPU bias). Further, the narrative templates may include a rationale portion that provides reasoning and description of why the VM instance type(s) are recommended for the workload, and how the VM instance type(s) adequately and efficiently support the workload.

Using the selected narrative template, the optimization service may then populate the fields with the various utilization characteristics and/or behavioral attributes for the workload. After populating the fields with the appropriate information, the optimization service may generate the final narrative and provide, or cause output, of the narrative and recommendations to the user. For example, the users may have registered for a user account with the service provider network, and user their user account information to log-in or otherwise access the narrative and recommendations via a console. In some instances, the users may utilize their use accounts to "opt in" or otherwise give the optimization service permission to collect the utilization data and provide narratives and recommendations to the users.

In some examples, the users may further provide input indicating a recommended VM instance type that the user would like to have support their workload. For example, the users may be able to select a recommended VM instance type, and have the optimization service migrate their workloads onto the recommended, optimized VM instance type. In some examples, the users may select an option, or "opt in," to give the optimization service permission to automate the migration of workloads to new VM instance types.

This application describes techniques that increase the overall utilization of computing resources provided by servers or other hardware devices, such as CPU, GPU, memory, disk, and/or network performance. The optimization service may determine VM instance types that are more appropriately tailored, or allocated a more appropriate amount of computing resources, to support for workloads. In this way, the techniques described herein help prevent underutilization of computing resources of a service provider network, which reduces the amount of computing resources that are (i) allocated or reserved for VM instances, but (ii) sit idle or unused because the VM instances are oversized for the workload they support. Additionally, the techniques improve the performance of workloads by intelligently placing workloads on VM instance types that are computationally biases or optimized to support the workloads. The optimization service may place the workloads on VM instances to help ensure that the workloads have sufficient amounts of computing resources available, of the types of computing resources needed, to help avoid over constrained VM instance types and workloads. Further, the techniques include using machine-generated narratives to drive up adoption of the recommended instance types by instilling trust in users, and informing users about their workloads. Moreover, the machine-generated narratives may provide objective and accurate information about workloads, as well as rationales for recommended VM instance types, that remove the human error and subjective analysis of utilization data.

Although the techniques described herein are with reference to virtual machines or VM instances and virtual machine types, in some examples, the techniques are applicable to any type of virtual computing resource. For example, the techniques are generally applicable to any type of virtual computing resource that is allocated underlying portions of physical computing resources and executes within a virtual machine, or independently executes on the physical computing resources. Such virtual computing resources can include a virtual machine, a container executing on a physical resource, a virtual machine instance running one or more containers, processes, software, and/or any other executable that is allocated portions of physical computing resources.

A container packages up code and all its dependencies so the application runs quickly and reliably from one computing environment to another. A container image is a stand-alone, executable package of software that includes everything needed to run an application: code, runtime, system tools, system libraries and settings. Container images become containers at runtime. Containers are thus an abstraction of the application layer (meaning that each container simulates a different software application). Though each container runs isolated processes, multiple containers can share a common operating system. In contrast, virtual machines (VMs) are an abstraction of the hardware layer (meaning that each VM simulates a physical machine that can run software). VM technology can use one physical server to run the equivalent of many servers (each of which is called a VM). While multiple VMs can run on one physical machine, each VM has its own copy of an Operating System, as well as the applications and their related files, libraries, and dependencies.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which an optimization service of a service provider network determines VM instance types that are optimized to support workloads on behalf of users. Further, the optimization service provides users with narratives that describe the workload and why the VM instance types are recommended for the workloads.

As illustrated, a service provider network 102 may be operated and/or managed by a service provider 104. The service provider network 102 may provide various services to users 108 to fulfill their computing resource needs, such as cloud-based computing resources. For example, the service provider network 102 may provide cloud-based, scalable, and network accessible compute power services, storage services, database services, and/or other services. Users 108 may utilize user devices 110 to subscribe for use of the computing resources and/or services provided by the service provider network 102. The service provider network 102 may include an optimization service 106 that is configured to identify VM instance types to support workloads of the users 108 which optimize performance of the workloads, and refrain from underutilization or overutilization of the computing resources that support the VM instances and workloads. Further, the optimization service 106 may be configured to provide narratives to the users that explain and describe the recommendations for the VM instance types.

The service provider network 102 may span across different geographic regions, and include or be associated with a computing resource network 112 that includes clusters of managed computing devices 114 (e.g., servers) stored in data centers located across the different geographic regions. In this way, users 108 who have subscribed for use of the network-based services supported by computing resources in the data centers need not invest in and maintain the computing infrastructure required to implement the various services that they may need. In some examples, users 108 of the service provider network 102 may access or utilize computing resources of the computing devices 114 in the data centers located in different geographic regions such that users 108 located in these different geographic regions are provided with access these resources and services.

Generally, the computing devices 114 may provide various types of computing resources, such as compute (CPU) resources (e.g., central processing units (CPUs) for processing data), memory resources (e.g., physical devices capable of storing information such as RAM or ROM), storage resources (e.g., disk storage or drive storage used to store data by various electronic, magnetic, optical, or mechanical changes to a surface layer of one or more rotating disks), graphics compute (GPU) resources (e.g., graphics processing units (GPUs)), and/or network throughput resources (e.g., average or measured rate of bit transmission per second over networks). The computing devices 114 may be various types of computing devices, such as devices that have different chip set generations, are from different vendors, have different hardware architectures, and so forth.

Thus, the computing resources of the computing-resource network 112 provided by the computing devices 114 can include, for example, any hardware computing device resources, such as processor computing power/capacity, read-only and/or random-access memory, data storage and retrieval systems, device interfaces such as network or peripheral device connections and ports, and the like. In some embodiments, these resources may be dispersed among multiple discrete hardware computing devices (e.g., servers), and these hardware computing devices 114 may implement or communicate with a virtualization layer and corresponding virtualization systems (e.g., a hypervisor on a server), whereby the compute resources are represented by, and made accessible as, virtual computing resources, such as instances of virtual machine or "VM instances." A virtual computing resource may be a logical construct, such as a data volume, data structure, file system, and the like, which corresponds to certain compute resources. Non-limiting examples of virtual computing resources include virtual machines and containers (as described below), logical data storage volumes capable of storing files and other data, software programs, data processing services, and the like.

As illustrated, the computing devices 114 may each support VM instances that may be different types of VM instances 116 provided by the service provider network 102. For instance, a computing device 114(1) may support one or more VM instances 116(1)-116(N). Each VM instance 116 may support a workload 118 of a user 108. Rather than allocating all the computing resources of an entire computing device 114 to support a workload 118 for the user 108, the service provider network 102 may include a virtualization layer (e.g., containing one or more hypervisors) that includes instances of "virtual" computing resources (also referred to interchangeably herein as "virtual machines" or "VM instances") that represent the allocated portions of the physical computing resources of the computing devices 114. These VM instances 116 may emulate computing devices 114 to operate and support workloads, and may have their own operating systems, processing capabilities, storage capacity, and network connections or interfaces.

Users 108 may create user accounts with the service provider 104 to utilize the resources and services of the service provider network. The users 108 may utilize their user devices 110 to communicate over one or more networks 120 (e.g., WANs, PANs, LANs, etc.) with the service provider network 102. The user devices 110 may comprise any type of computing device configured to communicate over network(s) 120, such as mobile phones, tablets, laptop computers, desktop computers, televisions, servers, and/or any other type of computing device. The users 108 may desire that the service provider network 102 host or support workloads 118 in the computing resource network 112 that is managed by the service provider 104. Accordingly, the users 108 may, via their user account, request that a workload be launched on their behalf, and provide workload data 122 via one or more user portals 124 (e.g., web console, command line interface (CLI), application programming interface (API), etc.). The user portals 124 may provide the workload data 122 to the optimization service 106. In some examples, the workload data 122 may comprise a infrastructure template or other representation of the infrastructure of the workload 118. The workload data 122 may be utilized by the service provider network 102 to provision and deploy the workload 118 in the computing-resource network 112 on behalf of the user 108.

As described herein, a workload 118 may generally include a designated collection or grouping of computing resources (e.g., compute, memory, storage, networking, etc.) in the computing-resource network 112, and the code or logic that performs functionality using the computing resources. The service provider network 102 may support a wide variety of workloads 118, such as web servers, databases, customer-facing applications, distributed data stores, batch processing, machine/deep learning training and/or inference, online gaming, video encoding, memory caching, and/or any other type of workload 118 that can be supported by computing resources of the computing-resource network 112.

In order to identify and recommend various optimized VM instance types to a user 108 for their workload 118, the optimization service 106 may collect or obtain various data associated with the workload 118, such as utilization data 126. The utilization data 126 may indicate consumption or usage of underlying computing resources of the computing-resource network 112 by the workload 118 and/or associated VM instance 116. The utilization data 126 may be collected over a time period (e.g., 1 hour, 1 day, 1 week, 1 month, 1 year, etc.) and represent historical consumption by the workload 118 across each dimension of compute. In some examples, a software agent installed on each VM instance 116 may collect the utilization data 126 and provide the utilization data 126 to the optimization service 106.

The optimization service 106 may further collect workload data 128, such as security policies or security group data, resource tags comprising metadata that describes the resources of the users 108 in the service provider network 102, machine image data indicating a machine image used to deploy the VM instances 116, and/or other workload data 128.

The optimization service may include a feature engineering processor 130 that includes one or more classifiers 132 used to characterize or identify behavioral attributes of the workload 118. As described in more detail below with respect to FIGS. 2 and 3, the feature engineering processor 130 may utilize the classifier(s) 132 to determine workload characteristics of the workload 118 such as a frequency characteristic, a stochasticity characteristic, an amplitude characteristic, a resource bias characteristic, a resource-ratio characteristic, and/or a workload type.

The optimization service 106 may additionally include an optimization component 134 that is configured to determine optimization data and headroom data. The optimization component 134 may receive the classifications and/or behavioral attributes for the workload 118 from the feature engineering processor 130, and determine an optimization target for the workload 118, as well as how much headroom should be provided for the workload 118. The optimization component 134 may determine a primary resource type, or the resource type that is allocated for the workload 118 and most likely to be entirely utilized by the workload 118, or the computing resource type that the workload 118 is most sensitive to. In some examples, the optimization target for resource consumption may be a measure of physical resource needed typically to run the workload 118, and the amount of headroom available for the workload 118 may be based on the amount of resources necessary to accommodate spikes in usage by the workload 118. Thus, the headroom may be a measure of the actual physical resource needed above the optimization target to handle intermittent load spikes and to mitigate risk. In some examples, the optimization component 134 may use the frequency characteristic to determine which parts of the utilization data 126 to consider and which to ignore for the purposes of sizing, and the optimization component 134 may use the stochasticity characteristic and amplitude characteristic to determine the percentile utilization that best reflects actual resource usage to derive the optimization target for the primary resource type and/or secondary resource types. Similarly, the optimization component 134 may determine how much headroom is necessary to accommodate spikes in usage based on the amplitude characteristics for the primary resource type and/ or secondary resource types.

The optimization component 134 may provide the optimization target and headroom data to a recommendation engine 136 that is configured to determine VM instance types that are optimized for the workload 118. As noted above, the optimization service 106 provides various VM instance types that support workloads 118 on behalf of users 108. The service provider 102 may offer a wide variety of VM instance types that differ based on (i) the amounts of physical computing resources allocated for use by the VM instance type, and/or (ii) the combinations of the types of physical computing resources allocated for use by the VM instance type. In some instances, there may be at least five high-level categories or types of computing resources included in the computing-resource network 112 and provided by the computing devices 114, which are CPU, GPU, memory, storage, and network throughput. The different VM instance types are allocated different amounts and/or combinations of these, and potentially other, computing resources. For example, the VM instance types may be allocated use of larger or smaller amounts of the different resource types to be computationally biased or optimized support workloads 118 with various computing resource utilization characteristics.

The VM instance types can include compute optimized types, memory optimized types, accelerated optimized types, storage optimized types, and/or network throughput optimized types. As a specific example, a VM instance type that is compute optimized may be allocated use of 4 vCPUs of 3.0 GHz processors where each core can run at up to 3.5 GHz, but only be allocated 8 gibibytes (GiB) of memory. Conversely, a VM instance type that is memory optimized may be allocated 32 GiB of memory, but only run on a 3.1 GHz processor with 2 vCPUs.

In addition to biasing the VM instance types by varying the amounts or ratios of computing resource types allocated for use by the different VM instance types, the service provider 104 may further include different sizes of VM instance types for workloads 118 that require more or less computing resources at various ratios. For example, a smaller VM instance type that is computationally biased may be allocated 2 vCPUs of a 3.0 GHz processor and 4 GiB of memory, and an extra-large VM instance type that is computationally biased may be allocated 72 vCPUs on the 3.0 GHz processor and 144 GiB of memory (e.g., 36× the vCPUs and memory allocation of the smaller type).

The recommendation engine 136 may be configured to determine one or more VM instance types that are optimized to host or support the workload 118. The recommendation engine 136 may use the utilization data 126, workload characteristics/attributes, optimization target and headroom data, and/or other data to derive a list of optimized VM instance types. In some examples, the recommendation engine 136 may further rank the VM instance types by ascending waste cost where waste cost is measured as the difference between physical resources needed to meet the optimization target plus headroom and the actual resource available on for the VM instance type. Additional detail regarding how the recommendation engine 136 determined the VM instance types that are optimized for the workload 118 can be found in FIGS. 2 and 3.

The recommendation engine 136 may provide the resultant recommendation list of VM instance types along with the workload characteristics/attributes to a narrative component 138. The narrative component 138 may use this data and selected optimization goals to derive an overall narrative to describe the workload 118 potentially along with individual narratives for each of the top N instance types in the recommendation list. The final recommendation with associated narrative, or the narrative/recommendation data 140, may then be available for presentation to the user 108. For example, the user 108 may access a dashboard 142 associated with their account to view a text-based narrative 144, as well as the list of recommendations 146 indicating optimized VM instance types.

In some examples, the user 108 may further be presented with options to apply or dismiss the recommendations. The user 108 can dismiss the recommendations and ignore the recommendations 146, or select one of the indicated VM instance types (or platforms) and choose to apply the recommendation. In such examples, the optimizations service 106 may provide an instruction to compute-management service associated with the computing-resource network 112 to migrate the workload(s) 118 of the user from being hosted on the current VM instance type of be hosted on VM instances 116 that correspond to the selected VM instance type that was determined to be more optimized for the workload 118. The recommendations 146 may be listed (or ranked) based on how well suited or optimized they are to support the workload 118. In addition to the recommended platforms, the recommendations 146 may further include an indication of the primary resource projected mean usage or utilization. Stated otherwise, the primary resource usage indicated as a percentage may indicate the projected mean utilization of the primary resource, such as CPU in this example. In this way, the user 108 is able to determine the average utilization of the primary resource that is projected to be utilized by the workload 118.

As illustrated, the user 108 may further be presented with a rationale 148 for one or more of the recommended platforms. The rationale 148 may indicate various reasons or explanations as to why a platform is recommended for the workload of the user 108. For instance, the rationale 148 may indicate how the platform is appropriate for the primary resource type, and also indicate how the platform is appropriate for secondary resource type usage. Further, the rationale 148 may indicate how the platforms are provisioned to ensure optimal through for various resource types.

The user 108 may provide input indicating that they would like to apply, dismiss, or cancel the recommendations 146 and associated narrative 144 and rationale. In some examples, the users 108 may be able to opt-in or request that the optimization service 106 automate the right-sizing of the workloads 118 on different VM instances 116. For instance, rather than having to provide input indicating they would like to apply the recommended 146, the user 108 may opt-in to allow the optimization service 106 to automatically migrate workloads 118 of the user 108 onto more optimized platforms or VM instance types without receiving further input from the user 108 other than the initial opt-in.

Generally, the optimization service 106, and components thereof, may comprise software, firmware, and/or other logic that is supported one computing device, or across more computing devices in the service provider network 102. Additionally, the optimization service 106 may comprise a single device, or a system of other devices.

Figure 2:
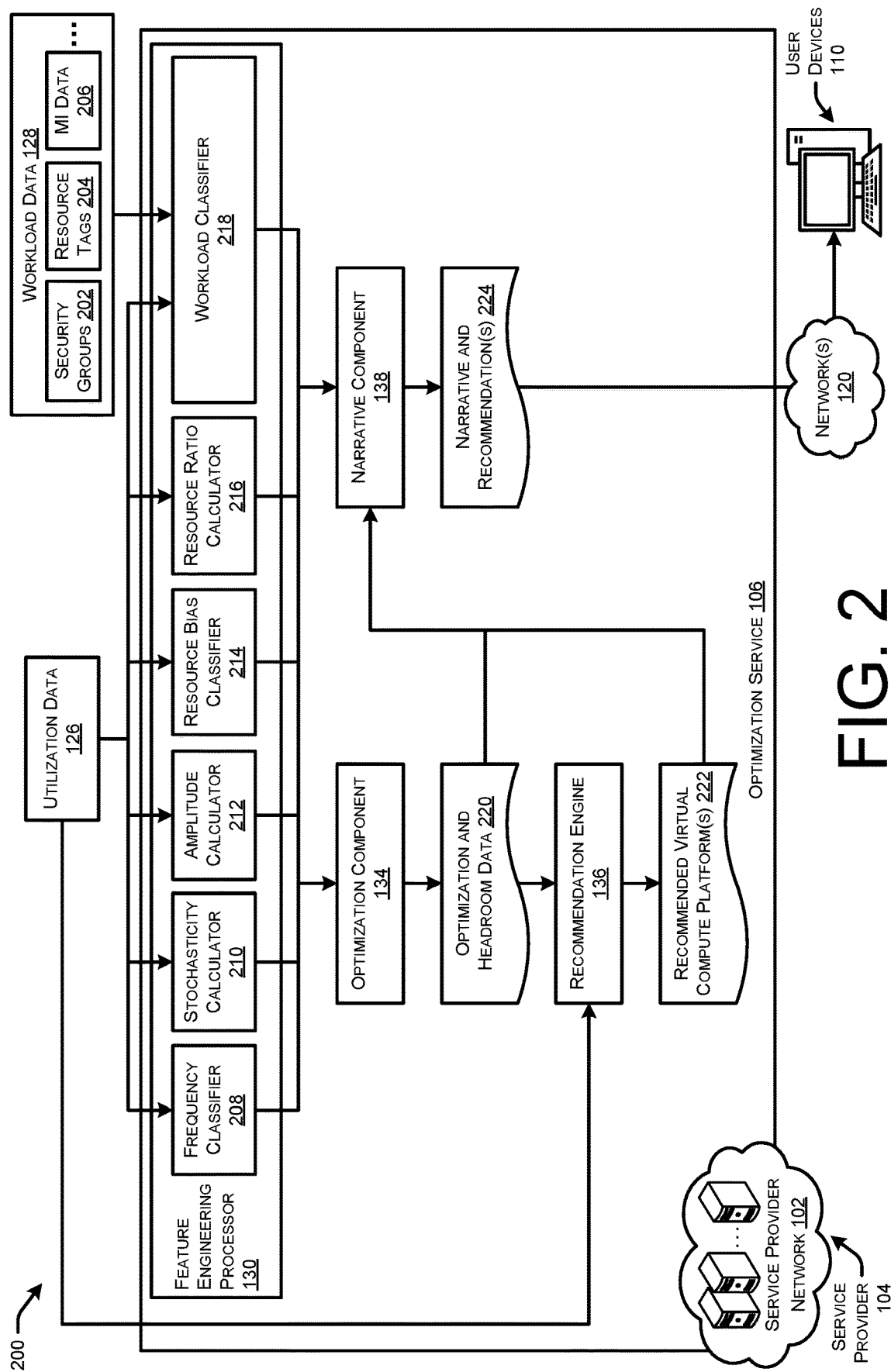
FIG. 2 illustrates a component diagram of example components of a service provider network that characterizes workloads based on their behavior, determines optimized virtual compute platforms for the workloads, generates narratives for the recommendations, and provides the recommendations and narratives to users.

FIG. 2 illustrates a component diagram 200 of example components of a service provider network 102 that characterizes workloads 118 based on their behavior, determines optimized virtual compute platforms (or VM instance types) for the workloads 118, generates narratives for the recommendations, and provides the recommendations and narratives to users 108.

Initially, the optimization service 106 may collect various types of data, such as utilization data 126 indicating physical resource consumption by the workload 118. The utilization data 126 may be collected over a time period (e.g., 1 hour, 1 day, 1 week, 1 month, 1 year, etc.) and represent historical consumption by the workload 118 across each dimension of compute. In some examples, a software agent installed on each VM instance 116 may collect the utilization data 126 and provide the utilization data 126 to the optimization service 106.

Further, the optimization service 106 may collect or obtain various workload data 128, such as security groups 202 that provide security at the protocol and port access level (similar to a firewall) and contains a set of rules that filter traffic coming into and out of an VM instance 116. Additionally, the workload data 128 may include resource tags 204, or metadata, that are assigned by users 108 to their resources that categories resources in various ways, such as by purpose, owner, or environment. Additionally, the workload data 128 may include machine image data 206 which provide the information required to launch the VM instances 116. The MI data 206 may include EBS snapshots or templates for the root volume of the instance (e.g., operating system, application server, etc.), launch permissions, etc.

Using this data, the feature engineering processor 130 may utilize various classifiers and/or calculators to characterize the workload 118 based on various behavioral attributes or intents. Generally, the feature engineering processor 130 may perform feature engineering by using domain knowledge of the utilization data to create features (or attributes, classifications, characteristics, etc.) that may be utilized for further analysis.

As illustrated, the feature engineering processor 130 may include a frequency classifier 208 that identifies or classifies, from the utilization data 126, a frequency characteristic for the workload 118. The frequency classifier 208 may evaluate the mean utilization for each resource type for which utilization data 126 is available for the time period and classify the utilization into various classes. The frequency classifier 208 may classify into example classes such as diurnal, semi-diurnal, mixed semi-diurnal, weekend, and non-periodic. These classifications generally exhibit behavioral patterns over time for consumption of each physical resource type by the workload 118. The classifications may be useful to determine whether it is appropriate to consider a mean utilization or whether the optimization service should only be sizing for a subset of the temporal data in order to avoid factoring in idle time.

The feature engineering processor 130 may further include a stochasticity calculator 210 that identifies or calculates, from the utilization data 126, a stochasticity characteristic for the workload 118. For instance, the stochasticity classifier 210 may determine the amount of variability in the workload 118 over the time period for each resource type and reflects this as a coefficient of variance. By way of example, one way of calculating the stochasticity characteristic is to derive the coefficient of variation of the mean resource utilization over the time period. By classifying the measure of variability of the workload 118, the optimization service 106 may determine the baseline utilization that should be used to calculate needed resource consumption for the resource. For example, a small amount of variance in the mean over the time period would indicate that the optimization service 106 can consider the mean of means of resource utilization as representative of what is needed, a high stochasticity indicates that we may want to use the mean of max.

The feature engineering processor 130 may further include an amplitude calculator 212 that identifies or calculates, from the utilization data 126, an amplitude characteristic for the workload 118. The amplitude characteristic may indicate the amplitude of the variability of usage by the workload 118. For instance, the amplitude characteristic may indicate the degree which a stochastic workload 118 spikes above its mean, and thus the headroom needed to account for spikes in usage. In some examples, the amplitude calculator 212 may determine the amplitude characteristic by determining an average of the difference between the normalized mean and maximum resource utilization for the time period of the utilization data 126.

The feature engineering processor 130 may further include a resource bias classifier 214 that identifies or classifies, from the utilization data 126, a resource bias characteristic for the workload 118. For instance, the resource bias classifier 214 may determine, from the utilization data 126, the primary compute resource that the workload 118 is most sensitive to. In some examples, the resource bias classifier 214 may determine the primary resource by deriving the actual resource consumption at max utilization and identifying which resource type was most constrained (or most likely to be the bottleneck). Stated otherwise, the primary resource type may be the resource type that the workload 118 will run out of first or is most sensitive about.

The feature engineering processor 130 may further include a resource ratio calculator 216 that identifies or calculates, from the utilization data 126, resource ratio characteristics for the workload 118. The resource ratio calculator 216 may determine the consumption rate of each resource type as a ratio of the primary resource type. Often, the primary resource consumption has a correlated effect on secondary resource consumption at a recognizable or identifiable ratio. These resource ratio characteristics may be utilized to determine sizing for all compute dimensions in relationship to each other. The resource ratio characteristics may further be utilized to help ensure appropriate sizing for any recommend VM instance type, as well as helping to generate a narrative to users 108 explaining the recommendations.

Further, the feature engineering processor 130 may include a workload classifier 218 that identifies or classifies, from the utilization data 126 and/or the workload data 128, resource ratio characteristics for the workload 118. Generally, to determine a workload type (also referred to herein as "workload category," "workload group," or "workload class") the workload classifier 218 may map the utilization data 126 and/or workload data 128 of the workload 118 to predefined workload types offered by the service provider network 102 based on the "shape" of the utilization characteristics of the workload 118. The shape of utilization characteristics can refer to the amount of usage across each different compute dimension. For example, the utilization data 126 of a workload 118 may be mapped to a workload category of "database," the utilization data 126 of another workload 118 may be mapped to a workload category for "web servers," and so forth. For each compute dimension, the mean utilization determined from the utilization data 126 may be mapped to predefined or predetermined resource utilization shapes for each of the predefined workload categories. The shape to which the mean utilization across each dimension of the workload 118 matches most closely with may be selected as the workload type or workload group for the workload 118.

The one or more classifications determined by the feature engineering processor 130 may be provided to the optimization component 134. The optimization component 134 may be configured to determine optimization target(s) for the workload 118 as well as headroom data 220. For example, the optimization component 134 may analyze the frequency characteristic to determine the degree of waste for the workload 118. For instance, a diurnal workload 118 may be likely to incur waste, but a workload that has an hourly usage pattern may be easier to tune for using unlimited and provisioned input/output operations per second (IOPS) type solutions.

Further, the optimization component 134 may determine optimization targets and headroom data 220 using the stochasticity characteristic. As an example, workloads 118 that are highly volatile, or have high degrees of variance, with low frequency in volatility may potentially be hosted on smaller virtual compute platforms (e.g., allocated less physical resources) to allow the variance to smear over time. However, a smaller virtual compute platform may increase risk. As another example, the stochastic characteristic may indicate less volatile workloads 118, which allow for a higher confidence recommendation by the optimization component 134 with respect to optimization and headroom data 220. Generally, the values for the stochastic characteristic may be represented by the coefficient of variation of the means for a resource utilization over the time interval of the utilization data 126.

The optimization component 134 may analyze the amplitude characteristic to determine the optimization and headroom data 220. For example, the degree of variance between low and high consumption in conjunction with the frequency of that variance may be utilized by the optimization component 134 to determine where to tune the resource consumption. For example, the optimization component 134 may determine that a workload 118 with high but infrequent network burst may be able to reside on a smaller platform which could smear the traffic over a longer window.

The optimization component 134 may further analyze the resource bias characteristics that indicate the primary resource type used by the workload 118 to determine the optimization and headroom data 220. For example, the VM instance types may be grouped into instance-type groups or "families" that are built based on resource biases or with resource biases in mind. The optimization component 134 may determine a VM instance type based on a VM instance type that is built based on the resource type that corresponds to the primary resource type of the workload 118.

The optimization component 134 may further analyze the resource ratio characteristic(s) to determine how to bias the VM instance type within a VM instance family that is biased for the primary resource type. For instance, one or more of the secondary resource types may be relatively strongly biased and also need to have higher amounts of underlying physical resources provisioned for use by the workload 118. Based on the ratio between the utilization by the workload 118 for the primary and secondary resource types, the optimization component 134 may determine VM instance types with corresponding ratios of computing resources allocated to them.

The optimization component 134 may further utilize the workload types to determine the optimization targets and headroom data 220. As an example, the workload types may be associated with predefined shapes of resource consumption and/or values of resource consumption that may indicate VM instance types. Additionally, the workload types may be associated with commonly used, or commonly suggested, VM instance types that are optimized for workloads 118 that belong to that workload type or category. In this way, the pool of possible VM instance types may be narrowed based on the VM instance type or category to which a workload 118 belongs.

The optimization target and headroom data 220 may be provided to the recommendation engine 136 which in turn determines and outputs recommended virtual compute platform(s) 222 (or VM instance types). Further, the recommendation engine 136 may receive the utilization data 126 as well as the characteristics or attributes determined for the workload 118. The recommendation engine 136 may be configured to determine one or more recommended virtual compute platforms 222 that are optimized to host or support the workload 118. The recommendation engine 136 may use the utilization data 126, workload characteristics/attributes, optimization target and headroom data 220, and/or other data to derive a list of recommended virtual compute platforms 222. In some examples, the recommendation engine 136 may further rank the virtual compute platforms 222 by ascending waste cost where waste cost is measured as the difference between physical resources needed to meet the optimization target plus headroom and the actual resource available on for the VM instance type.

Generally, the recommendation engine 136 may map the characteristics and/or attributes of the workload 118, and the optimization target and headroom data 220, to virtual compute platforms 222 that are allocated use of physical resources that correspond most strongly to the workload 118 utilization characteristics. For instance, a workload 118 that consumes CPU as a primary resource type, and/or belongs to a workload category that is CPU dominant, may be initially mapped to a family or grouping of virtual compute platforms 222 that are biased for CPU workloads 118. Further, the resource ratio characteristic(s) for the workload 118 may be utilized to identify virtual compute platforms 222 that are allocated similar ratios and/or values of primary and secondary compute resources consumed by the workload (e.g., 4:2:1:0:1 ratio for the 5 dimensions of compute). Additionally, the recommendation engine 136 may identify virtual compute platforms 222 that are oversized enough on one or more dimensions of compute to account for, or substantially account for, the amplitude characteristics and/or stochasticity characteristics of the workload 118 (e.g., allows the usage of resources to scale). In some examples, the recommendation engine 136 may comprise a rules-based engine that maps or determines virtual compute platforms 222 that most closely match or are biased to optimized performance of the workload 118 based on the utilization characteristics or attributes of the workload 118.

The recommendation engine 136 may then provide the recommended virtual compute platforms 222 to the narrative component 138, which also receives the optimization and headroom data 220 along with the utilization characteristics or attributes of the workload 118. The narrative component 138 may utilize the various data and selected optimization goals to derive an overall narrative and recommendations 224, where the narrative describes the workload 118 and along with individual narratives for each of the top virtual compute platforms 222 in the recommendation list.

To generate the narrative and recommendations 224, the narrative component 138 may select a narrative template from among a set of predefined narrative templates to be used to generate the narrative. The narrative component 138 may select the narrative template based on the above-noted characteristics or behavioral attributes, such as the workload type or category to which the workload was determined to belong. The narrative template may include populated portions that include template language appropriate for a narrative for that workload type, as well as unpopulated fields that are to be filled or populated with workload-specific information for the workload. In some examples, the narrative templates may include a background portion that provides background information regarding the workload and the VM instance type that is currently supporting the workload. The background portion may help inform the user about their workload, and also instill trust with the user that the optimization service is informed and knowledgeable about the workload of the user. Further, the narrative templates may include a recommendation portion that indicates the recommended VM instance platforms, as well as an indication of a mean utilization by the workload of the primary resource type determined for the workload. For instance, the recommendations may indicate a percentage of utilization of a CPU resource allocated to each recommended VM instance type for a compute-biased workload (CPU bias). Further, the narrative templates may include a rationale portion that provides reasoning and description of why the VM instance type(s) are recommended for the workload, and how the VM instance type(s) adequately and efficiently support the workload.

The narrative component 138 may utilize the narrative templates and the various data received including the optimization and headroom data 220, the recommended virtual compute platform's 222, the characteristics or attributes of the workload, and/or the workload type to generate the narrative and recommendations 224. The narrative and recommendations 224 may be provided to the user devices 110 for display to a user 108, as described in more detail in FIG. 4.

Figure 3:
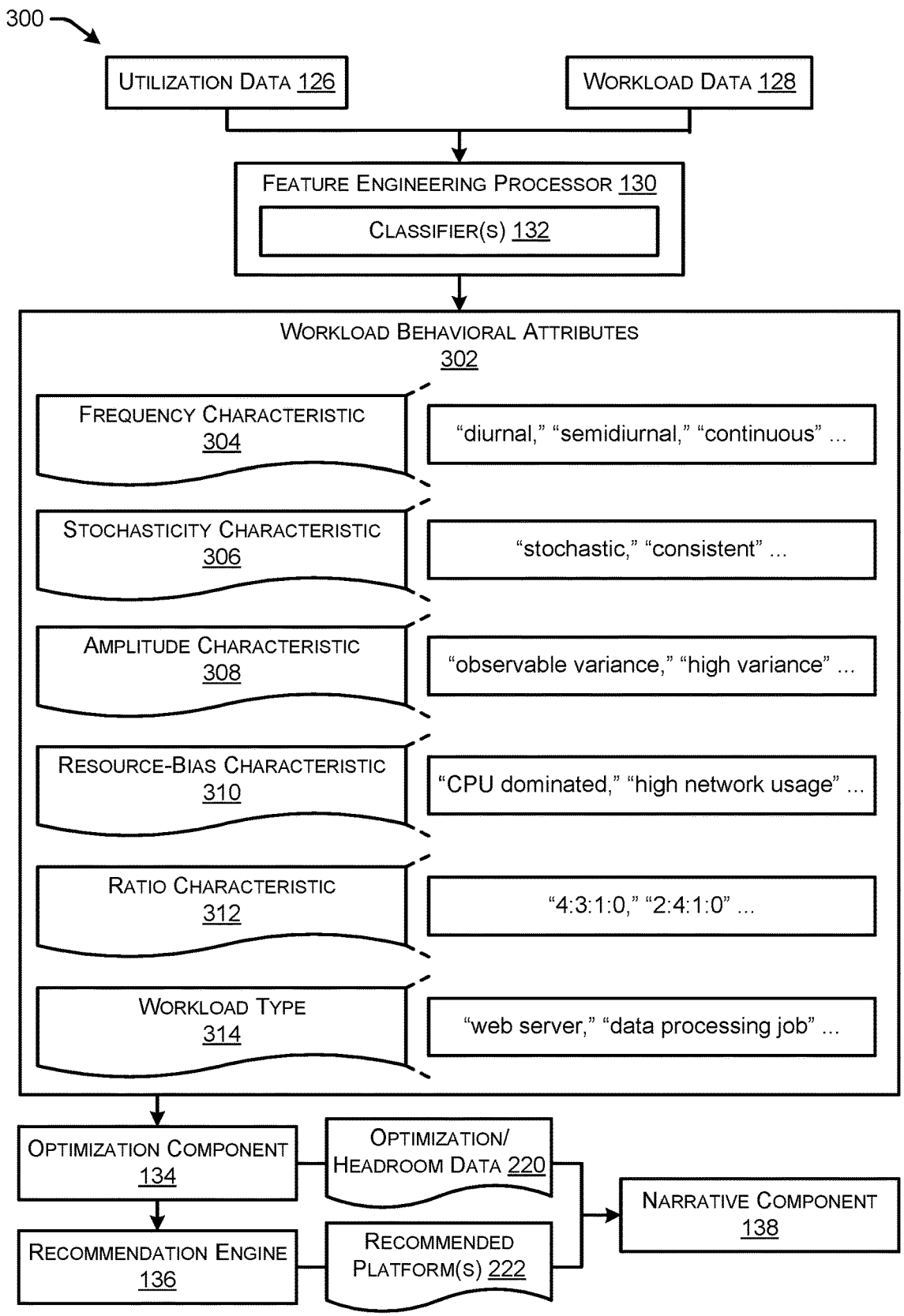
FIG. 3 illustrates a component diagram that includes components for determining behavioral attributes for a workload, and providing the behavioral attributes to components that determine recommended virtual compute platforms and generate narratives for the recommendations.

FIG. 3 illustrates a component diagram 300 including components for determining behavioral attributes 302 for a workload 118, and providing the behavioral attributes 302 to components that determine recommended virtual compute platforms 222 and generate narratives for the recommendations.

As described in FIG. 2, the feature engineering processor 130 may receive utilization data 126 indicating resource consumption for a period of time by a workload, and workload data 128 associated with the workload 118 and describing characteristics of the workload 118. The feature engineering process 130 may utilize the one or more classifiers 132 (or calculators, components, etc.) to determine workload behavioral attributes 302.

As illustrated, the feature engineering processor 130 may determine a frequency characteristic 304 using the mean utilization for each resource type for which utilization data 126 is available and classifies the utilization into a set of classes. In some examples, the frequency characteristic 304 may comprise one or more textual words that represent the behavioral pattern for usage by the workload 118 of the resource types, such as diurnal, semi-diurnal, continuous, mixed semi-diurnal, weekend, non-periodic, etc. The utilization data 126 may indicate these behavioral patterns. For instance, the CPU usage may spike above the mean utilization by a threshold amount twice a day indicating a semi-diurnal characteristic, or once a day for diurnal characteristic, or not at all above the threshold for continuous. In this way, the frequency characteristic 304 may include or correspond to textual words that may be utilized to generate the narrative by the narrative component 138.

Further, the feature engineering processor 130 may determine a stochasticity characteristic 306 that indicates the amount of variability in the workload's 118 resource consumption over time for each resource type. The stochasticity characteristic 306 may be determined using a calculation by deriving the coefficient of variation of the mean resource utilization over the time period. Based on the coefficient of variation, the stochasticity characteristic 306 for the workload 118 may indicate stochastic, consistent, etc.

The feature engineering processor 130 may determine an amplitude characteristic 308 that indicates the amplitude of the variability in the resource usage by the workload 118 over one or more of the compute dimensions. Based on the degree to which a stochastic workload 118 spikes above its mean utilization value, the feature engineering processor 130 may determine the amplitude characteristic 308. For instance, if the amplitude of the spikes is above an upper threshold, the amplitude characteristic 308 may correspond to a high variance, and if the amplitude of the spikes is between an upper and lower threshold, the amplitude characteristic 308 may correspond to observable variance, and so forth.

The feature engineering processor 130 may determine a resource-bias characteristic 310 that indicates the primary resource type to which the workload 118 is most sensitive. For instance, the resource-bias characteristic 310 may indicate that the workload 118 is CPU dominated, has high network usage, and/or other indications of the resource type that is the primary resource type determined as described above.

The feature engineering processor 130 may determine a ratio characteristic 312 that indicates the consumption rate of each resource type as a ratio of the primary resource type. In some examples, the ratio characteristic 312 may indicate the consumption rate of each resource type as a ratio of the primary resource type according to a predefined order and using integers, such as "4:3:1:0," "2:4:1:0," and so forth. However, this is merely illustrative and any ratio between the secondary resource types and the primary resource type may be utilized.

The feature engineering processor 130 may determine a workload type 314 for the workload 118 using the techniques described above. For instance, the workload 118 may be mapped to workload groups or categories based on the "shape" of the utilization characteristics of the workload 118. For instance, the workload groups may generally be associated with predefined or determined utilization characteristics across the five dimensions of compute. The workload 118 may belong to the workload category that has the utilization characteristics that most closely match to the shape of the utilization characteristics of the workload 118. The workload type 314 may generally include types such as database workload types, caching workload types, web server workload types, data processing jobs, etc.

As described above with respect to FIGS. 1 and 2, one or more of the workload behavioral attributes 302 may be provided to the optimization component 134 and recommendation engine 136. The optimization component 134 may determine and provide the optimization/headroom data 220 to the narrative component 138 and the recommendation engine 136 may determine and provide the recommended platforms 222 to the narrative component 138.

Figure 4:
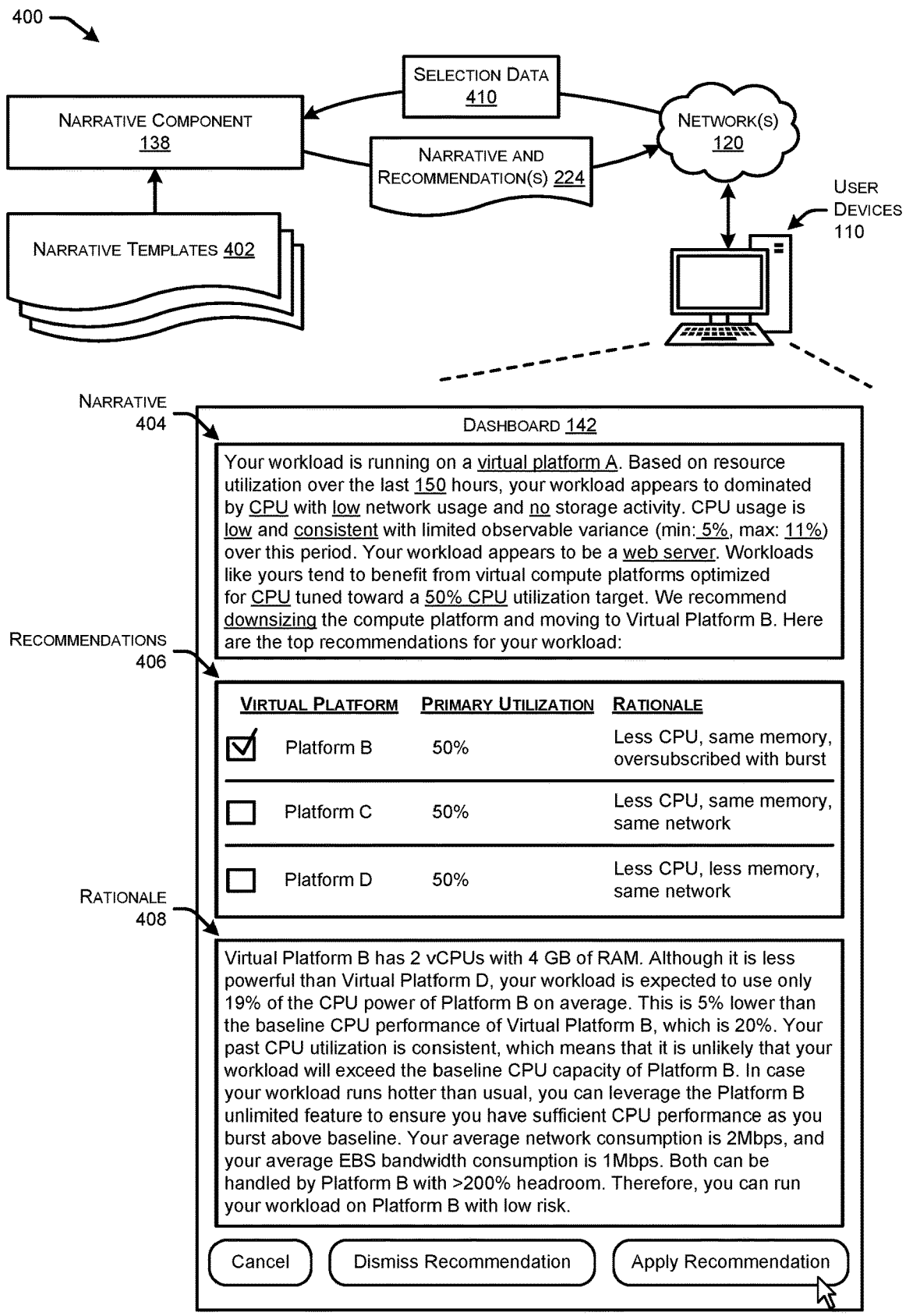
FIG. 4 illustrates graphical user interface that includes a narrative for a workload, a set of recommendations for virtual compute platforms that are optimized for the workload, and rationales regarding the recommendations.

FIG. 4 illustrates graphical user interface 400 that includes a narrative for a workload 118, a set of recommendations for virtual compute platforms that are optimized for the workload, and rationales regarding the recommendations.

As illustrated, the narrative component 138 may identify, from among a set of narrative templates 402, a particular narrative template 402 that is to be used to generate the narrative 224. In some examples, the narrative component 138 may select the narrative template 402 that corresponds to a workload type or category determined for the workload 118 based on the utilization data 126. As described above, the narrative component 138 may populate the fields of the narrative templates 402 with workload-specific information determined for the workload 118, such as utilization data 126 information, characteristics or attributes of the workload 118, the workload type, the primary resource type consumed by the workload 118, the recommended VM instance types, rationales for the recommended VM instance types, etc. Upon generating the narrative, the narrative component 138 may provide the narrative and recommendations 224 to the user devices 110 over the network(s) 120. The user devices 110 may then output, such as via a display (and/or audio output, video output, etc.), a dashboard 142 that includes data represented in the narrative and recommendations 224.

As illustrated, the dashboard 142 may present the narrative 404 for the recommendations. As shown, underlined portions of the narrative 404 may correspond to fields of the selected narrative template 402 that were populated by the narrative component 138. As shown, the narrative 404 includes fields that were populated to indicate, among other data, the current virtual platform, the time period of the utilization data 126, the primary resource type (CPU), the ratios for the secondary resource types (e.g., network and storage). Further, the narrative may have fields that were populated to indicate the stochasticity and amplitude of the primary resource type usage (e.g., low and consistent), as well as the observable variance values determined for the workload 118. Additionally, the narrative 404 indicates that the workload type is a web server, and that web servers tend to benefit from CP-biased compute platforms tuned towards a particular utilization target (e.g., 50%).

Further, the dashboard 142 may present the recommendations 406 which includes a listing of recommended platforms 222. Additionally, the recommendations 406 may include platform-specific rationales that explain why the particular platform is recommended for the workload 118, as well as the mean utilization rate of the primary resource type (e.g., 50%). Additionally, the dashboard 142 may provide further rationale 408 that indicates the benefits of the recommended platforms and the reasons that each platform is recommended.

In some examples, the dashboard 142 may further include options that are selectable by a user 108 of the user device 110. The user 108 may provide input data indicating a selection of a particular platform (e.g., platform B), as well as a request to apply the recommended virtual platform for the workload 118. In such examples, the user device 110 may generate and send selection data 410 to the service provider network 102 that indicates a request to migrate the workload 110 from the current platform A onto the selected platform B.

It should be understood that the GUI 400 is merely illustrative, and any type of user interface, or combination of user interfaces, may be utilized to receive input data indicating a selection of a recommended VM instance type. Additionally, any type of input mechanism may be used to receive input data (e.g., selection data 410) that can be used to select a VM instance type or compute platform than that described and illustrated.

FIGS. 5A, 5B, 6, and 7 illustrate flow diagrams of example methods 500, 600, and 700 that illustrate aspects of the functions performed at least partly by the service provider network 102 as described in this disclosure. The logical operations described herein with respect to FIGS. 5A, 5B, 6, and 7 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5A, 5B, 6, and 7 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 5A:
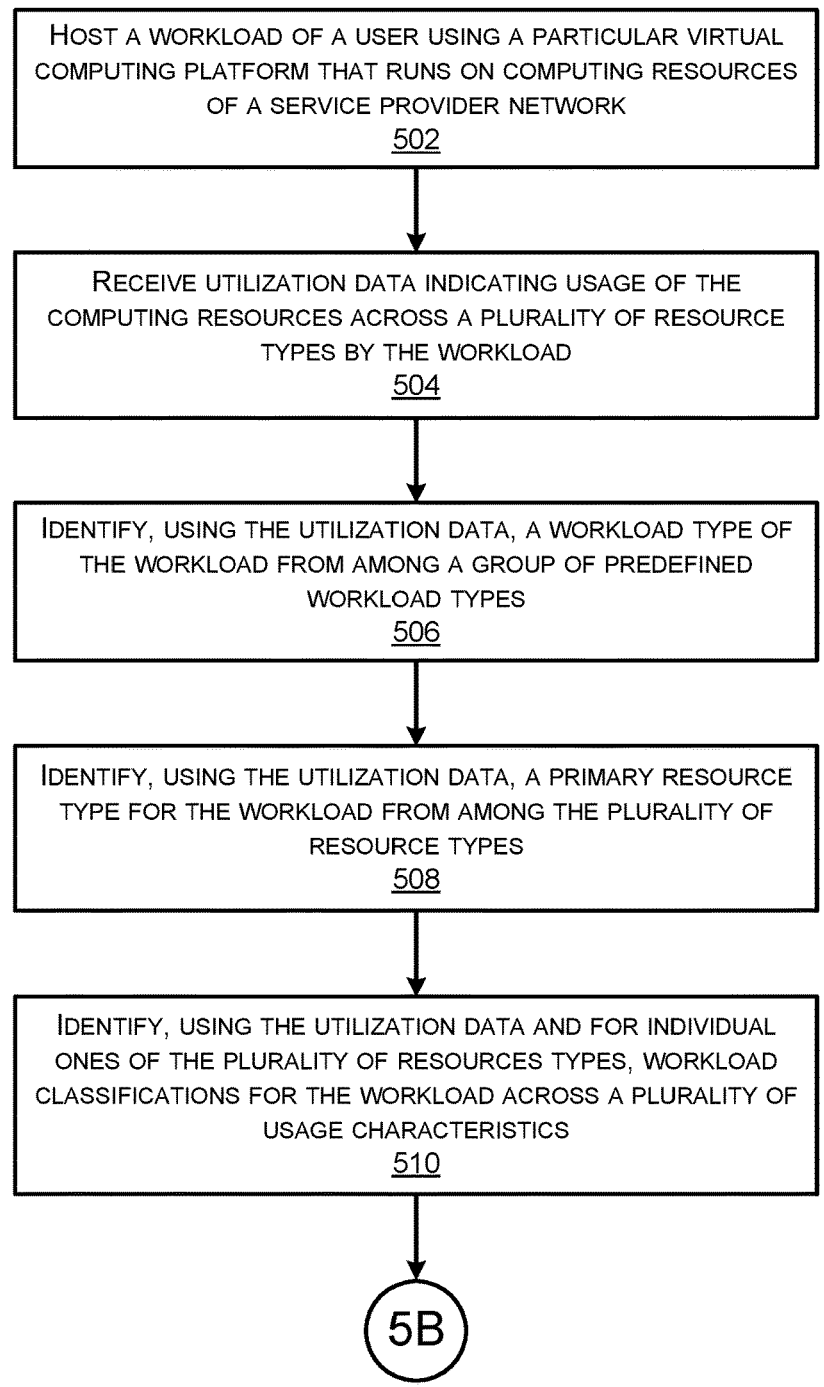
FIGS. 5A and 5B collectively illustrate a flow diagram of an example method for a service provider network to receive utilization data for a workload and identify a workload type, a primary resource type, and workload classifications for the workload. Further, the example method includes determining a recommended virtual computing platform, generating a narrative for the recommended platform, and providing the user with access to the narrative and recommended platform.
Figure 5B:
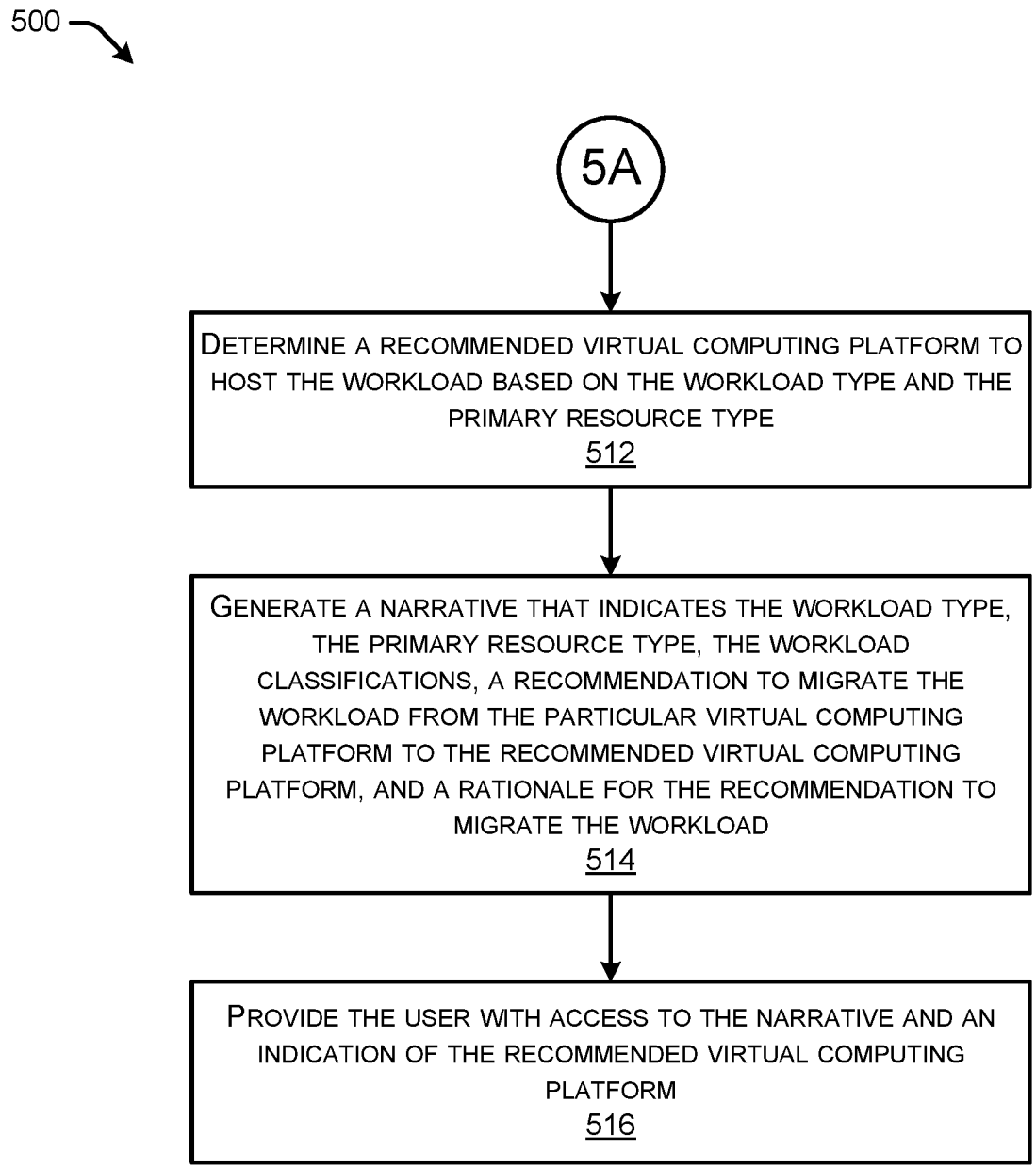

FIGS. 5A and 5B collectively illustrate a flow diagram of an example method 500 for a service provider network 102 to receive utilization data 126 for a workload 118 and identify a workload type, a primary resource type, and workload classifications for the workload 118. Further, the example method 500 includes determining a recommended virtual computing platform, generating a narrative for the recommended platform, and providing the user with access to the narrative and recommended platform. As described herein, a virtual computing platform may comprise one or more of a VM instance 116, a virtual container, a program, and/or any other virtual representation. Specifically, the virtual computing platform can be a particular family and size of VM instance 116 identified from among a pool of offered families and sizes of VM instances 116. Each family of VM instances may have different types and/or ratios of allocated underlying hardware resources (e.g., CPU, memory, disk, networking, and GPU), and each size of VM instance within a family may have a different quantity of the allocated underlying hardware resources.

In some examples, the techniques of method 500 are performed using a system that includes one or more processors, and one or more computer-readable media storing computer-executable instructions that, when executed by the one or more processors, cause the one or more processors to perform the techniques of method 500.

At 502, the service provider network 102 may host a workload 118 of a user 106 using a particular virtual computing platform (e.g., VM instance 116) that runs on computing resources (e.g., computing device(s) 114) of the service provider network 102. The computing resources may be allocated for use by the particular virtual computing platform based on the biases of the particular virtual computing platform.

At 504, the service provider network 102 may receive utilization data 126 indicating usage of the computing resources across a plurality of resource types by the workload 118. Generally, the plurality of resource types includes at least two of a central processing unit (CPU) resource type, a graphic processing unit (GPU) resource type, a memory resource type, a storage resource type, or a network performance resource type.

At 506, the service provider network 102 may, using the utilization data, identify a workload type of the workload 118 from among a group of predefined workload types; a primary resource type for the workload 118 from among the plurality of resource types, wherein the primary resource type being a type of the computing resources allocated to the particular virtual computing platform that is most likely to be entirely utilized by the workload, and for individual ones of the plurality of resources types, workload classifications for the workload across a plurality of usage characteristics.

At 508, the service provider network 102 may determine a recommended virtual computing platform to host the workload 118 based on the workload type and the primary resource type. At 510, the service provider network 102 may generate a narrative 224 that indicates the workload type, the primary resource type, the workload classifications (e.g., workload behavioral attributes 302), a recommendation to migrate the workload from the particular virtual computing platform to the recommended virtual computing platform, and a rationale 408 for the recommendation to migrate the workload. At 512, the service provider network 102 may provide the user 108 with access to the narrative and an indication of the recommended virtual computing platform.

In some examples, the usage characteristics comprise at least one of a periodicity characteristic for consumption of the computing resources by the workload across the plurality of resource types, a stochasticity characteristic for consumption of the computing resources by the workload across the plurality of resource types, an amplitude characteristic for consumption of the computing resources by the workload across the plurality of resource types, or a ratio characteristic indicating a ratio of usage of the primary resource type with respect to usage of a secondary resource type of the plurality of resource types.

To generate the narrative, the service provider network 102 may identify a set of narrative templates 402 based on the workload type, select a particular narrative template 402 from among the set of narrative templates 402, and populate one or more fields in the particular narrative template 402 to generate the narrative 224.

Figure 6:
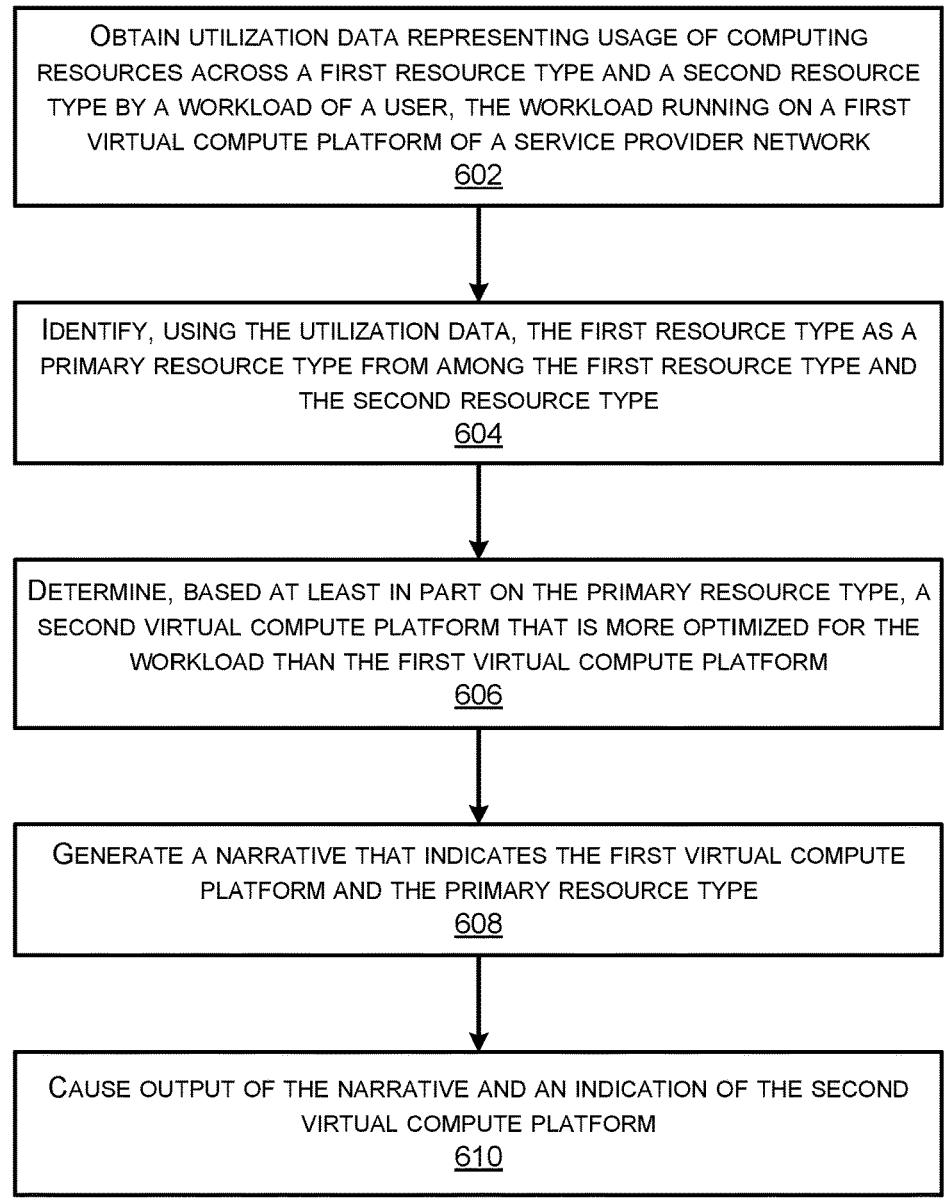
FIG. 6 illustrates a flow diagram of an example method for a service provider network to obtain utilization data, identify a primary resource type, determine a recommended virtual compute platform, generate a narrative for the workload, and cause output of the narrative and an indication of the recommended virtual compute platform.

FIG. 6 illustrates a flow diagram of an example method 600 for a service provider network 102 to obtain utilization data 126, identify a primary resource type, determine a recommended virtual compute platform, generate a narrative for the workload 118, and cause output of the narrative and an indication of the recommended virtual compute platform.

At 602, a service provider network 102 may obtain utilization data 126 representing usage of computing resources across a first resource type and a second resource type by a workload 118 of a user 108 where the workload is running on a first virtual compute platform of the service provider network 102.

At 604, the service provider network 102 may identify, using the utilization data 126, the first resource type as a primary resource type from among the first resource type and the second resource type. At 606, the service provider network 102 may determine, based at least in part on the primary resource type, a second virtual compute platform that is more optimized for the workload than the first virtual compute platform. For instance, the service provider network 102 may determine that a second virtual compute platform is allocated a more optimized amount of the primary resource type as compared to the first virtual compute platform.

At 608, the service provider network 102 may generate a narrative that indicates the first virtual compute platform and the primary resource type. In one example, the narrative 404 may indicate the current virtual platform being used by the workload 118 and the primary resource type being consumed by the workload 118.

At 610, the service provider network 102 may cause output of the narrative 404 and an indication of the second virtual compute platform (e.g., recommendation 406 of a more optimized virtual platform).

In some examples, the method 600 may further comprise identifying, using the utilization data 126, a workload type of the workload 118 from among a group of predefined workload types wherein the narrative 404 further indicates the workload type of the workload 118. In various examples, the method 600 may further comprise identifying a time period for which the utilization data 126 represents the usage of the computing resources by the workload 118, and the narrative further indicates the time period.

In some instance, the narrative further includes a recommendation that the user migrate the workload 118 from the first virtual compute platform to the second virtual compute platform, and a rationale for the recommendation to migrate the workload 118.

Figure 7:
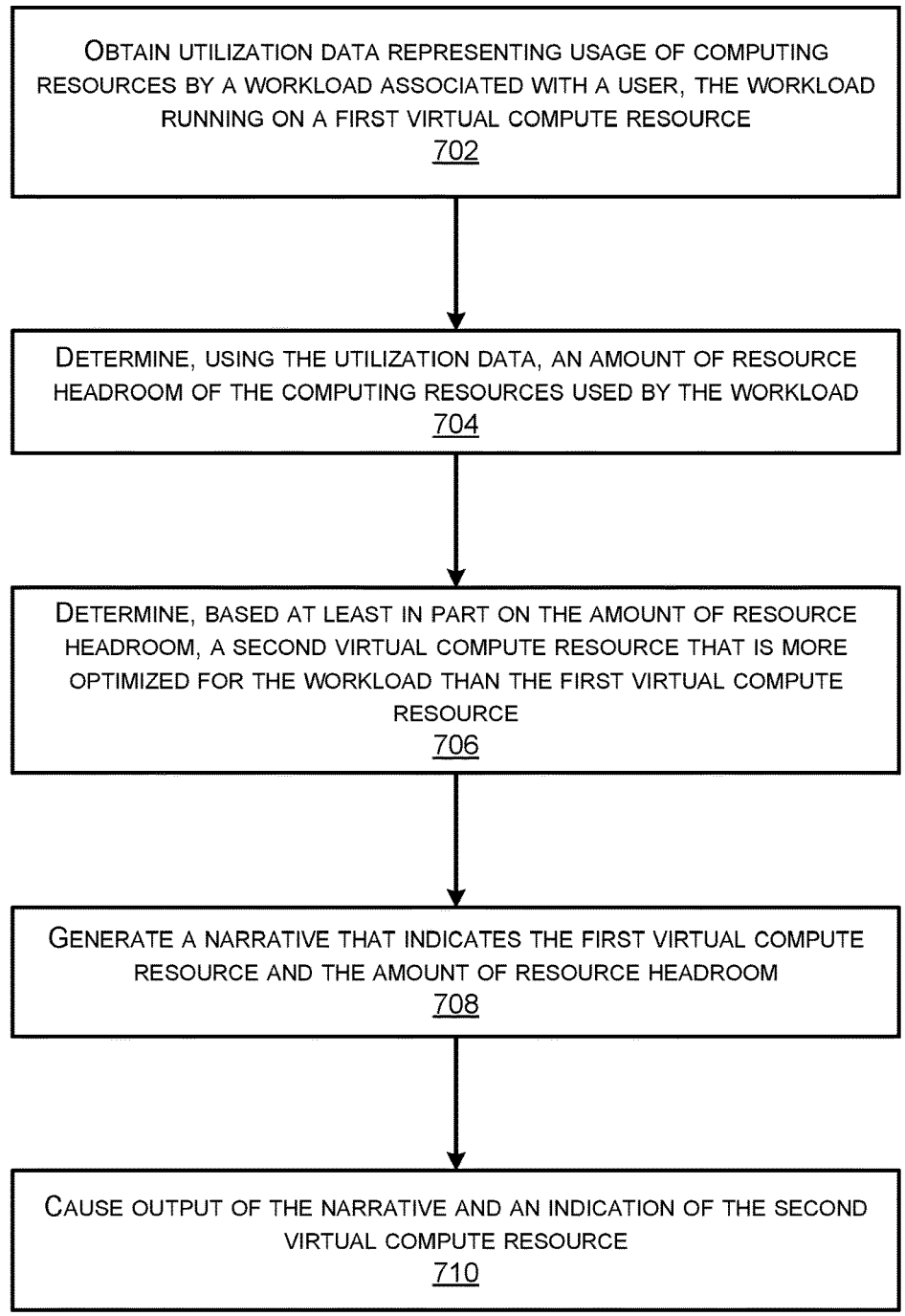
FIG. 7 illustrates a flow diagram of an example method for a service provider network to obtain utilization data, determine a recommended virtual compute platform, generate a narrative for the workload, and cause output of the narrative and an indication of the recommended virtual compute platform.

FIG. 7 illustrates a flow diagram of an example method 700 for a service provider network 102 to obtain utilization data 126, determine a recommended virtual compute platform, generate a narrative for the workload 118, and cause output of the narrative and an indication of the recommended virtual compute platform.

At 702, a service provider network 102 may obtain (e.g., collect, receive, etc.) utilization data 126 representing usage of computing resources by a workload 118 associated with a user 108 where the workload 118 is running on a first virtual compute resource, At 704, the service provider network 102 may determine, using the utilization data 126, an amount of resource headroom of the computing resources used by the workload 118. For example, the service provider network 102 may determine an amplitude characteristic for one or more resource types (e.g., primary resource type, secondary resource type(s), etc.) indicating an amount over the mean utilization that is utilized by the workload 118. The service provider network may take into account the resource headroom needed or used by the workload 118 when selecting a new VM instance type that is to support the workload 118 to ensure that usage spikes by the workload 118 are supported by the VM instance type.

At 706, the service provider network 102 may determine, based at least in part on the amount of resource headroom, a second virtual compute resource that is more optimized for the workload 118 than the first virtual compute resource. For instance, the service provider network 102 may select a second virtual compute resource that is allocated an amount of underlying physical resource(s) that are able to handle entirely, or sufficiently, the spike in usage by the workload 118 across one or more resource types. At 708, the service provider network 102 may generate a narrative that indicates the first virtual compute resource and the amount of resource headroom, and at 708, the service provider network 102 may cause output of the narrative and an indication of the second virtual compute resource.

Figure 8:
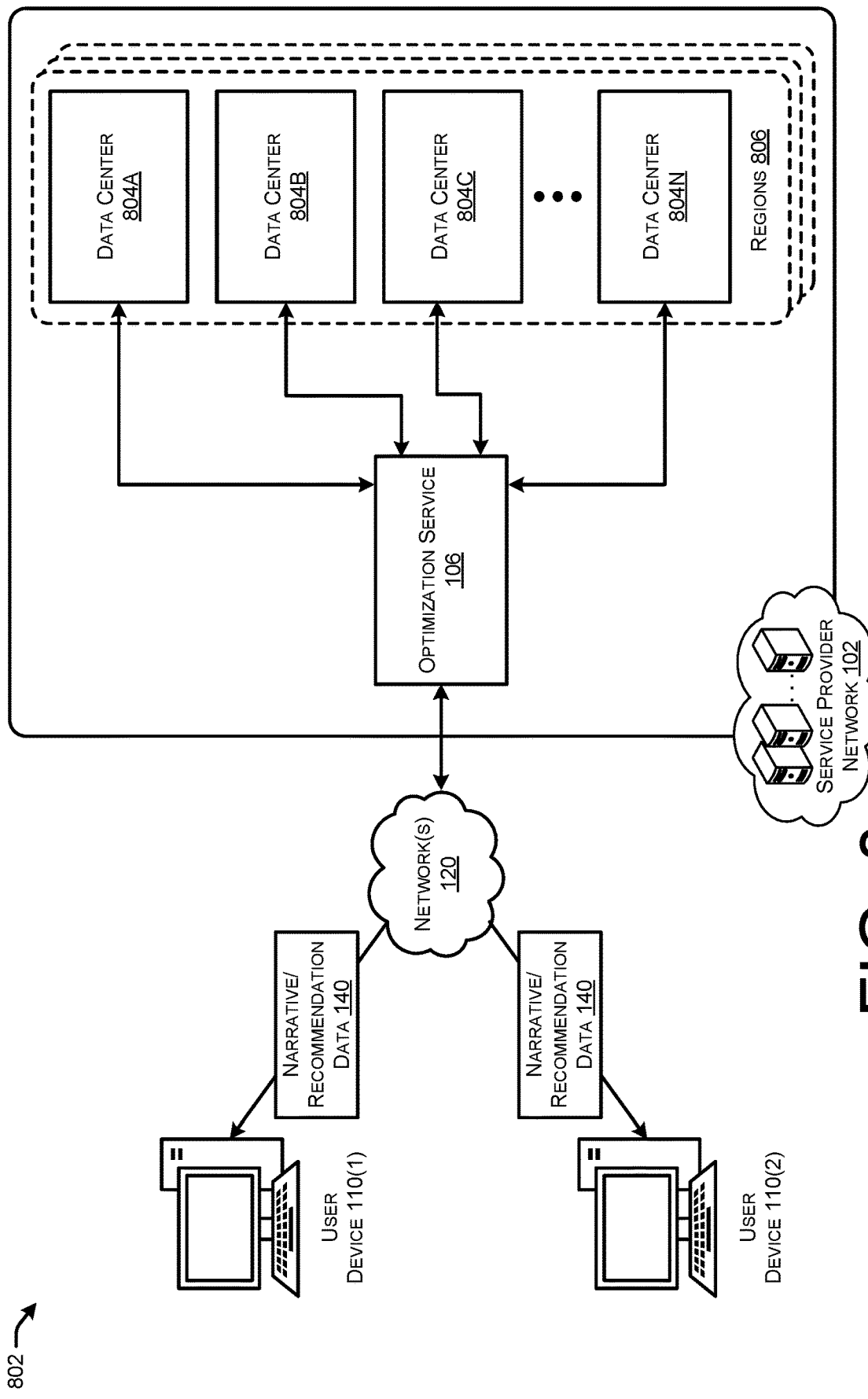
FIG. 8 is a system and network diagram that shows an illustrative operating environment that includes data centers of a service provider network that can be configured to implement aspects of the functionality described herein.

FIG. 8 is a system and network diagram that shows an illustrative operating environment that includes data centers a service provider network 102 that can be configured to implement aspects of the functionality described herein. The service provider network 102 can provide computing resources, like VM instances and storage, on a permanent or an as-needed basis. Among other types of functionality, the computing resources provided by the service provider network 102 may be utilized to implement the various services described above. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 804A-804N (which might be referred to herein singularly as "a data center 804" or in the plural as "the data centers 804"). The data centers 804 are facilities utilized to house and operate computer systems and associated components. The data centers 804 typically include redundant and backup power, communications, cooling, and security systems. The data centers 804 can also be located in geographically disparate locations, or regions 806. One illustrative embodiment for a data center 804 that can be utilized to implement the technologies disclosed herein will be described below with regard to FIG. 9.

The users 108 of the user devices 110 that utilize the service provider network 102 may access the computing resources provided by the service provider network 102 over any wired and/or wireless network(s) 120, which can be a wide area communication network ("WAN"), such as the Internet, an intranet or an Internet service provider ("ISP") network or a combination of such networks. For example, and without limitation, a user device 110 operated by a user 108 of the service provider network 102 may be utilized to access the service provider network 102 by way of the network(s) 120. It should be appreciated that a local-area network ("LAN"), the Internet, or any other networking topology known in the art that connects the data centers 804 to remote clients and other users can be utilized. It should also be appreciated that combinations of such networks can also be utilized.

Figure 9:
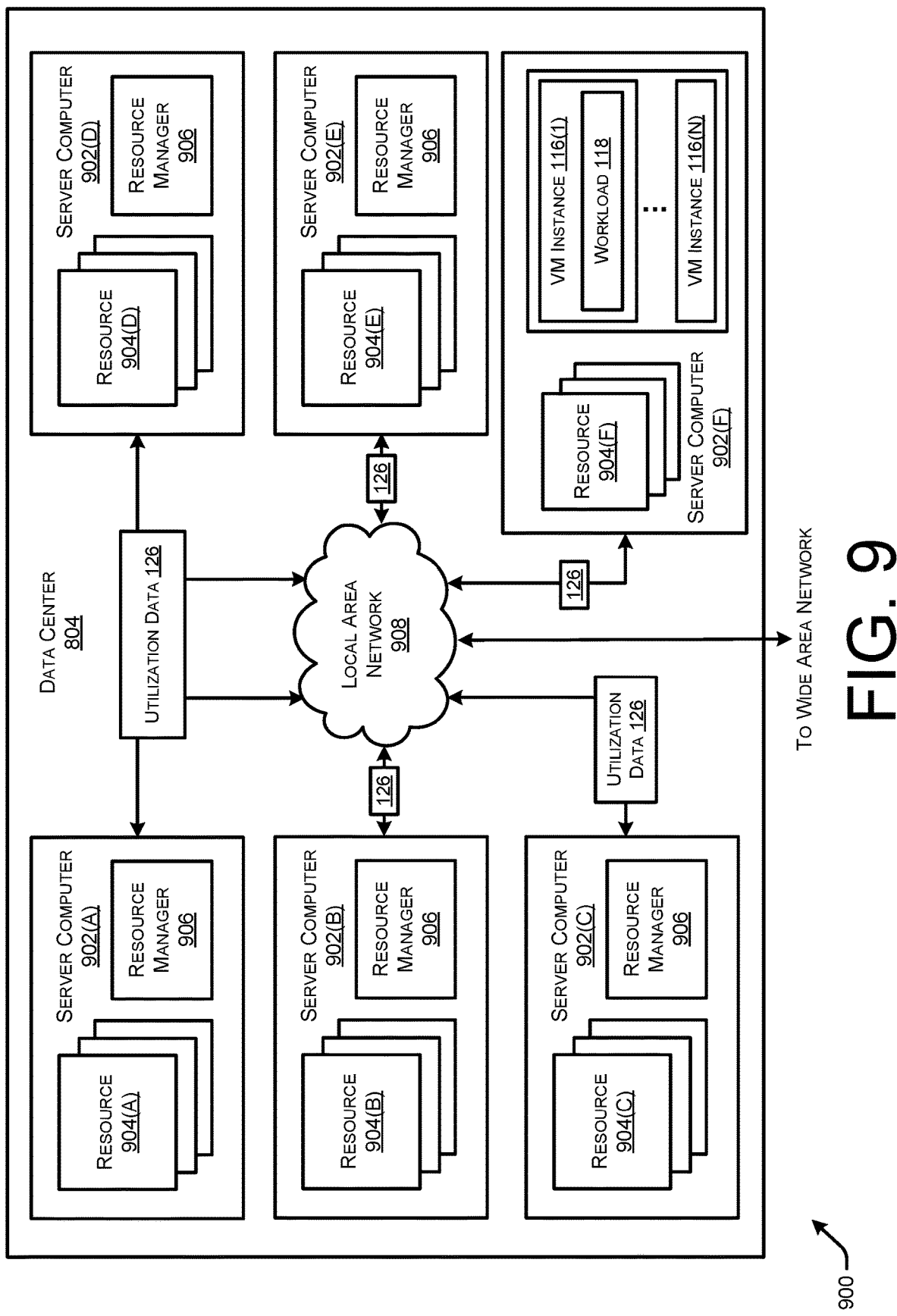
FIG. 9 is a computing system diagram illustrating a configuration for a data center that can be utilized to implement aspects of the technologies disclosed herein.

FIG. 9 is a computing system diagram 900 that illustrates one configuration for a data center 804 that implements aspects of the technologies disclosed herein. The example data center 804 shown in FIG. 9 includes several server computers 902A-902F (which might be referred to herein singularly as "a server computer 902" or in the plural as "the server computers 902") for providing computing resources 904A-904E. In some examples, the resources 904 and/or server computers 902 may include, be included in, or correspond to, the computing devices 114 described herein.

The server computers 902 can be standard tower, rack-mount, or blade server computers configured appropriately for providing the computing resources described herein (illustrated in FIG. 9 as the computing resources 904A-904E). As mentioned above, the computing resources provided by the service provider network 102 can be data processing resources such as VM instances or hardware computing systems, database clusters, computing clusters, storage clusters, data storage resources, database resources, networking resources, and others. Some of the servers 902 can also be configured to execute a resource manager 906 capable of instantiating and/or managing the computing resources. In the case of VM instances, for example, the resource manager 906 can be a hypervisor or another type of program configured to enable the execution of multiple VM instances on a single server computer 902. Server computers 902 in the data center 804 can also be configured to provide network services and other types of services.

In the example data center 804 shown in FIG. 9, an appropriate LAN 908 is also utilized to interconnect the server computers 902A-902F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 804A-804N, between each of the server computers 902A-902F in each data center 804, and, potentially, between computing resources in each of the server computers 902. It should be appreciated that the configuration of the data center 804 described with reference to FIG. 9 is merely illustrative and that other implementations can be utilized.

As illustrated in FIG. 9, each of the server computers 902 may be running one or more VM instances 116 that are hosting workloads 118. The server computer 902 may utilize the resources 904 that provide one or more of the dimensions of compute utilized by the workloads 118 and VM instances 116. Each of the workloads 118 may have respective utilization data 126 collected over a time period and provided to the optimization service 106.

Figure 10:
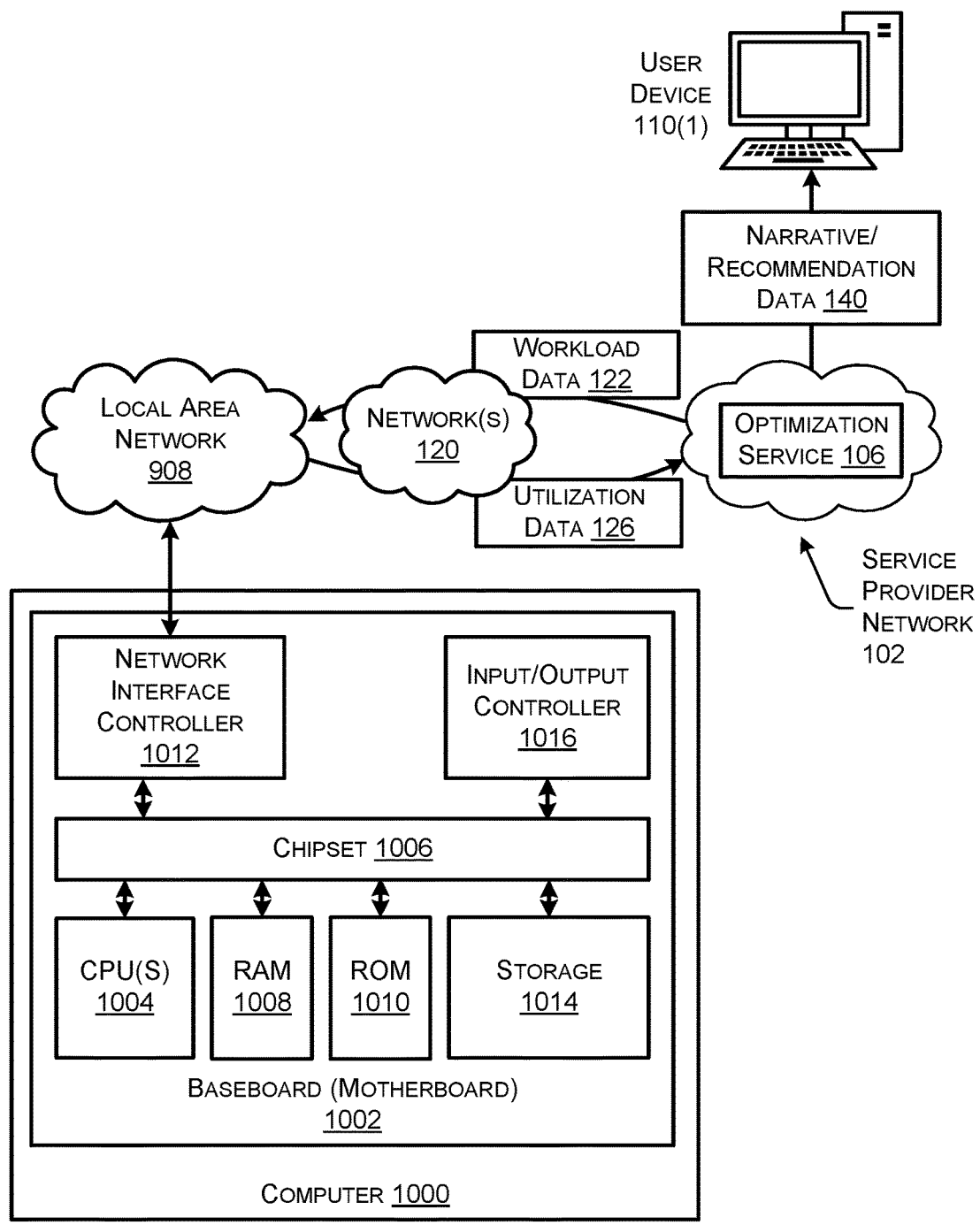
FIG. 10 is a computer architecture diagram showing an illustrative computer hardware architecture for implementing a computing device that can be utilized to implement aspects of the various technologies presented herein.

FIG. 10 shows an example computer architecture for a computer 1000 capable of executing program components for implementing the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein. In some examples, the server computer 1000 may correspond to, or be the same as or similar to, a computing device 114 described in FIG. 1.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 908. The chipset 1006 can include functionality for providing network connectivity through a network interface controller (NIC) 1012, such as a gigabit Ethernet adapter. The NIC 1012 is capable of connecting the computer 1000 to other computing devices over the network 908 (or 120). It should be appreciated that multiple NICs 1012 can be present in the computer 1000, connecting the computer to other types of networks and remote computer systems.

The computer 1000 can include storage 1014 (e.g., disk) that provides non-volatile storage for the computer. The storage 1014 can consist of one or more physical storage units. The storage 1014 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the storage 1014 by detecting the physical states or characteristics of one or more particular locations within the physical storage units.

In addition to the storage 1014 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000. In some examples, the operations performed by the service provider network 102, and or any components included therein, may be supported by one or more devices similar to computer 1000. Stated otherwise, some or all of the operations performed by the service provider network 102, and or any components included therein, may be performed by one or more computer devices 1000 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 1014 can store an operating system utilized to control the operation of the computer 1000. According to one embodiment, the operating system comprises the LINUX operating system. According to another embodiment, the operating system comprises the WINDOWS SERVER operating system from MICROSOFT Corporation of Redmond, Wash. According to further embodiments, the operating system can comprise the UNIX operating system or one of its variants. It should be appreciated that other operating systems can also be utilized. The storage 1014 can store other system or application programs and data utilized by the computer 1000.

In one embodiment, the storage 1014, RAM 1008, ROM 1010, and/or other computer-readable storage media may be encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various techniques described above. The computer 1000 can also include computer-readable storage media having instructions stored thereupon for performing any of the other computer-implemented operations described herein.

The computer 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or might utilize an architecture completely different than that shown in FIG. 10.

As described herein, the service provider network 102 may include one or more hardware processors (processors), one or more devices, configured to execute one or more stored instructions. The processor(s) may comprise one or more cores. Further, the service provider network 102 may include one or more network interfaces configured to provide communications between the service provider network 102 and other devices, such as the user device(s) 110, computing devices 114, and/or other systems or devices in the service provider network 102 and/or remote from the service provider network 102. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi, and so forth.

The service provider network 102 may also include computer-readable media that stores various executable components (e.g., software-based components, firmware-based components, etc.). In addition to various components discussed in FIGS. 1-4, the computer-readable-media may further store components to implement functionality described herein. While not illustrated, the computer-readable media may store one or more operating systems utilized to control the operation of the one or more devices that comprise the service provider network 102. According to one embodiment, the operating system comprises the LINUX operating system. According to another embodiment, the operating system(s) comprise the WINDOWS SERVER operating system from MICROSOFT Corporation of Redmond, Wash. According to further embodiments, the operating system(s) can comprise the UNIX operating system or one of its variants. It should be appreciated that other operating systems can also be utilized.

Additionally, the service provider network 102 may include one or more data stores which may comprise one, or multiple, repositories or other storage locations for persistently storing and managing collections of data such as databases, simple files, binary, and/or any other data. The data store(s) may include one or more storage locations that may be managed by one or more database management systems.

To utilize the services provided by the service provider network 102, users 108 may register for an account with the service provider network 102. For instance, users 108 may utilize a user device 110 to interact with an identity and access management (IAM) component that allows the users 108 to create user accounts with the service provider network 102. Generally, the IAM component may enable the users 108 to manage their workloads 118 and other computing resources securely. Using the IAM component, the users 108 may manage their VM instances 116 as described herein. Additionally, users 108 may perform various operations for interacting with the optimization service 106 via their user accounts, such as providing workload data 122, receiving narrative/recommendation data 140, proving input data indicating selections of VM instance types, and/or other interactions may be authorized via credentials required to access the user accounts.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   one or more processors; and
   one or more computer-readable media storing computer-executable instructions that, when executed by the one or more processors, cause the one or more processors to:
      host a workload of a user using a particular virtual computing platform that runs on computing resources of a service provider network, the computing resources being allocated for use by the particular virtual computing platform;
      receive utilization data indicating usage of the computing resources across a plurality of resource types by the workload;
      using the utilization data, identify:
         a workload type of the workload from among a group of predefined workload types;
         a primary resource type for the workload from among the plurality of resource types, the primary resource type being a type of the computing resources allocated to the particular virtual computing platform that is most likely to be entirely utilized by the workload; and
         for individual ones of the plurality of resources types, workload classifications for the workload across a plurality of usage characteristics;
      determine a recommended virtual computing platform to host the workload based on the workload type and the primary resource type;
      generate a narrative that indicates:
         the workload type;
         the primary resource type;
         the workload classifications;
         a recommendation to migrate the workload from the particular virtual computing platform to the recommended virtual computing platform; and
         a rationale for the recommendation to migrate the workload; and
      provide the user with access to the narrative and an indication of the recommended virtual computing platform.

2. The system of claim 1, wherein the plurality of resource types includes at least two of:
   a central processing unit (CPU) resource type;
   a graphic processing unit (GPU) resource type;
   a memory resource type;
   a storage resource type; or
   a network performance resource type.

3. The system of claim 1, wherein the usage characteristics comprise at least one of:
   a periodicity characteristic for consumption of the computing resources by the workload across the plurality of resource types;
   a stochasticity characteristic for consumption of the computing resources by the workload across the plurality of resource types;
   an amplitude characteristic for consumption of the computing resources by the workload across the plurality of resource types; or
   a ratio characteristic indicating a ratio of usage of the primary resource type with respect to usage of a secondary resource type of the plurality of resource types.

4. The system of claim 1, comprising further computer-executable instructions that, when executed by the one or more processors, cause the one or more processors to:
   identify a set of narrative templates based on the workload type;
   select a particular narrative template from among the set of narrative templates; and
   populate one or more fields in the particular narrative template to generate the narrative.

5. A computer-implemented method comprising:
   obtaining utilization data representing usage of computing resources by a workload of a user, the workload running on a first virtual compute platform of a service provider network;
   identifying, using the utilization data, a workload characteristic of the workload;
   determining, based at least in part on the workload characteristic, a second virtual compute platform that is more optimized for the workload than the first virtual compute platform;
   selecting, from among multiple narrative templates, a particular narrative template based at least in part on the workload characteristic;
   populating the particular narrative template to generate a narrative that indicates the first virtual compute platform and the primary resource type; and
   causing output of the narrative and an indication of the second virtual compute platform.

6. The computer-implemented method of claim 5, further comprising:
   identifying, using the utilization data, a workload type of the workload from among a group of predefined workload types,
   wherein the narrative further indicates the workload type of the workload.

7. The computer-implemented method of claim 5, further comprising:
   identifying a time period for which the utilization data represents the usage of the computing resources by the workload,
   wherein the narrative further indicates the time period.

8. The computer-implemented method of claim 5, wherein the narrative includes:
   a recommendation that the user migrate the workload from the first virtual compute platform to the second virtual compute platform; and
   a rationale for the recommendation to migrate the workload.

9. The computer-implemented method of claim 5, wherein the utilization data represents usage of the computing resources across a first resource type and a second resource type, further comprising:
   identifying, using the utilization data, a usage characteristic including at least one of:
      a periodicity characteristic for the usage of the computing resources across at least one of the first resource type or the second resource type by the workload;
      a stochasticity characteristic for the usage of the computing resources across at least one of the first resource type or the second resource type by the workload;
      an amplitude characteristic for the usage of the computing resources across at least one of the first resource type or the second resource type by the workload; or
      a ratio characteristic indicating a ratio of the usage of the primary resource type with respect to the usage of the second resource type,
   wherein determining the second virtual compute platform that is more optimized for the workload than the first virtual compute platform is based at least in part on the usage characteristic.

10. The computer-implemented method of claim 5, wherein the utilization data represents usage of the computing resources across a first resource type and a second resource type, further comprising:
   identifying, using the utilization data, a usage characteristic including at least one of:
      a periodicity characteristic for the usage of the computing resources across at least one of the first resource type or the second resource type by the workload;
      a stochasticity characteristic for the usage of the computing resources across at least one of the first resource type or the second resource type by the workload;
      an amplitude characteristic for the usage of the computing resources across at least one of the first resource type or the second resource type by the workload; or
      a ratio characteristic indicating a ratio of the usage of the primary resource type with respect to the usage of the second resource type,
   wherein the narrative further indicates the usage characteristic.

11. The computer-implemented method of claim 5, wherein the utilization data represents usage of the computing resources across a first resource type and a second resource type, further comprising identifying the first resource type as a primary resource type by determining that the first virtual compute platform is most likely to entirely utilize the computing resources of the first resource type before the computing resources of the second resource type.

12. The computer-implemented method of claim 5, wherein the utilization data represents usage of the computing resources across a first resource type and a second resource type, further comprising:
   determining, based at least in part on the utilization data, amplitude data indicating a spike in the usage of the computing resources across the first resource type by the workload, the spike representing usage over a mean usage of the computing resources of the first resource type; and
   determining, based at least in part on the amplitude data, an availability amount over the mean usage of the first resource type that is to be allocated for use by the workload,
   wherein determining the second virtual compute platform is based at least in part on the availability amount of the first resource type.

13. The computer-implemented method of claim 5, wherein the narrative includes a recommendation that the user migrate the workload from the first virtual compute platform to a second virtual compute platform, further comprising:
   receiving a request to migrate the workload from the first virtual compute platform type to being supported by the second virtual compute platform; and
   migrating the workload from the first virtual compute platform to the second virtual compute platform.

14. A system comprising:
   one or more processors; and
   one or more computer-readable media storing computer-executable instructions that, when executed by the one or more processors, cause the one or more processors to perform operations comprising:
      receiving utilization data representing usage of computing resources across a first resource type and a second resource type by a workload, the workload running on a first virtual compute platform of a service provider network;
      identifying, using the utilization data, the first resource type as a primary resource type from among the first resource type and the second resource type, the primary resource type being a type of the computing resources allocated to the first virtual compute platform that is most likely to be entirely utilized by the workload;
      determining, based at least in part on the primary resource type, a second virtual compute platform that is more optimized for the workload than the first virtual compute platform;
      selecting, from among multiple narrative templates, a particular narrative template based at least in part on at least one of the second virtual compute platform or the primary resource type;
      using the particular narrative template, generating a narrative that indicates the first virtual compute platform and the primary resource type; and
      causing output of the narrative and an indication of the second virtual compute platform.

15. The system of claim 14, the operations further comprising:
   determining, using the utilization data, an amount of resource headroom of the computing resources used by the workload;
   wherein determining the second virtual compute platform is based at least in part on the amount of resource headroom.

16. The system of claim 14, the operations further comprising:
   identifying a time period for which the utilization data represents the usage of the computing resources by the workload, wherein the narrative further indicates the time period.

17. The system of claim 14, wherein the narrative includes:
- a recommendation to migrate the workload from the first virtual compute platform to the second virtual compute platform; and
- a rationale for the recommendation to migrate the workload.

18. The system of claim 14, the operations further comprising:
- identifying, using the utilization data, a workload type of the workload from among a group of predefined workload types;
- identifying multiple narrative templates based at least in part on the workload type, wherein selecting the particular narrative template from among the multiple narrative templates is further performed based at least in part on the workload type; and
- populating the particular narrative template to generate the narrative.

19. The system of claim 14, the operations further comprising:
- identifying, using the utilization data, a usage characteristic including at least one of:
  - a periodicity characteristic for the usage of the computing resources across at least one of the first resource type or the second resource type by the workload;
  - a stochasticity characteristic for the usage of the computing resources across at least one of the first resource type or the second resource type by the workload;
  - an amplitude characteristic for the usage of the computing resources across at least one of the first resource type or the second resource type by the workload; or
  - a ratio characteristic indicating a ratio of the usage of the primary resource type with respect to the usage of the second resource type,
- wherein determining the second virtual compute platform that is more optimized for the workload than the first virtual compute platform is based at least in part on the usage characteristic.

20. The system of claim 14, wherein:
- the first virtual compute platform is allocated use of a first amount of the computing resources of the first resource type and a second amount of the computing resources of the second resource type;
- the second virtual compute platform is allocated use of a third amount of the computing resources of the first resource type and a fourth amount of the computing resources of the second resource type; and
- at least one of the first amount is different than the third amount or the second amount is different than the fourth amount.

\* \* \* \* \*